(12) United States Patent
Matsubara et al.

(10) Patent No.: US 9,420,271 B2
(45) Date of Patent: Aug. 16, 2016

(54) STORAGE MEDIUM STORING INFORMATION PROCESSING PROGRAM, INFORMATION PROCESSING APPARATUS, INFORMATION PROCESSING SYSTEM, AND INFORMATION PROCESSING METHOD

(75) Inventors: Yasushi Matsubara, Kyoto (JP); Yumi Todo, Kai (JP); Shinichi Kawaji, Kai (JP)

(73) Assignees: Nintendo Co., Ltd., Kyoto (JP); HAL Laboratory, Inc., Tokyo (JP)

( * ) Notice: Subject to any disclaimer, the term of this patent is extended or adjusted under 35 U.S.C. 154(b) by 725 days.

(21) Appl. No.: 12/979,672

(22) Filed: Dec. 28, 2010

(65) Prior Publication Data

US 2012/0075350 A1    Mar. 29, 2012

(30) Foreign Application Priority Data

Sep. 24, 2010  (JP) ................................. 2010-213066

(51) Int. Cl.
*G06F 3/01*    (2006.01)
*H04N 13/04*   (2006.01)

(52) U.S. Cl.
CPC .................................. *H04N 13/0452* (2013.01)

(58) Field of Classification Search
CPC .................... G06F 2203/04803; G06F 3/0485; G06F 3/01
USPC .................... 345/684, 173, 156, 676; 715/773
See application file for complete search history.

(56) References Cited

U.S. PATENT DOCUMENTS

| 2006/0227106 | A1* | 10/2006 | Hashimoto et al. ........... 345/157 |
| 2009/0059093 | A1* | 3/2009 | Li et al. ........................ 348/739 |
| 2010/0066698 | A1* | 3/2010 | Seo ................................ 345/173 |
| 2010/0162128 | A1* | 6/2010 | Richardson et al. .......... 715/744 |
| 2010/0185981 | A1* | 7/2010 | Nakada et al. ................ 715/810 |
| 2011/0099509 | A1* | 4/2011 | Horagai ........................ 715/784 |
| 2013/0042205 | A1  | 2/2013 | Tsuda et al. |

FOREIGN PATENT DOCUMENTS

| JP | 3267282       | 1/2002  |
| JP | 2002-215613   | 8/2002  |
| JP | 2007-122430   | 5/2007  |
| JP | 2009-245038   | 10/2009 |
| JP | 2010-204891   | 9/2010  |
| WO | WO 2011/125362 A1 | 10/2011 |

* cited by examiner

*Primary Examiner* — Ke Xiao
*Assistant Examiner* — Kim-Thanh T Tran
(74) *Attorney, Agent, or Firm* — Nixon & Vanderhye P.C.

(57) ABSTRACT

An information processing apparatus has upper and lower LCDs different in width and an inputter such as a touch panel, or the like. A computer of the information processing apparatus displays, out of information being made up of plurality of pages, information of a predetermined page on the upper and lower LCDs so as to be fit into the width of the lower LCD, and displays, when there is a previous or next page previous or next to the predetermined page, a part of the previous or next page at blank potions on both sides of the upper LCD. Then, in response to an input from the inputter, the information of the page displayed on the upper and lower LCDs is switched to the information corresponding to the previous or next page displayed at the blank potions on the upper LCD.

17 Claims, 17 Drawing Sheets (A)

(B)

(A)

RIGHT END OF SEVENTH PAGE

NO PAGE DISPLAY (BLACKOUT)

(B)

RIGHT END OF SEVENTH PAGE

LEFT END OF FIRST PAGE (A)

NO PAGE DISPLAY
(BLACKOUT)

LEFT END OF
SECOND PAGE (B)

RIGHT END OF
EIGHTH PAGE

LEFT END OF
SECOND PAGE (B)

STORAGE MEDIUM STORING INFORMATION PROCESSING PROGRAM, INFORMATION PROCESSING APPARATUS, INFORMATION PROCESSING SYSTEM, AND INFORMATION PROCESSING METHOD

CROSS REFERENCE OF RELATED APPLICATION

The disclosure of Japanese Patent Application No. 2010-213066 is incorporated herein by reference.

BACKGROUND OF THE INVENTION

1. Field of the Invention

The present invention relates to a storage medium storing an information processing program, an information processing apparatus, an information processing system and an information processing method. More specifically, the present invention relates to a storage medium storing an information processing program, an information processing apparatus, an information processing system and an information processing method for displaying by switching information being made up of plurality of displayed portions.

2. Description of the Related Art

Conventionally, a technique of displaying information being made up of a plurality of pages as if they are turned according to an operation by a user is widely known. For example, the Japanese patent No. 3267282 (Patent Document 1) discloses that information (double-page spread of the book, for example) is statically displayed over two screens, and by inclining the screen or performing a stroking operation on the screen (touch panel) like turning a page by the user, a display as if a page is turned can be performed.

However, in the Patent Document 1, it was impossible to easily know whether or not there are pages previous to and next to the information displayed on the two screens. That is, the user cannot know whether or not the page can actually be turned until he or she performs an operation of turning the page.

SUMMARY OF THE INVENTION

Therefore, it is a primary object of the present invention to provide a novel storage medium storing an information processing program, a novel information processing apparatus, a novel information processing system and a novel information processing method.

Another object of the present invention is to provide a storage medium storing an information processing program, an information processing apparatus, an information processing system and an information processing method that allow a user to easily know information to be displayed previous and next to information displayed on the screen.

The present invention employs following features in order to solve the above-described problems.

A first invention is a storage medium storing an information processing program causing a computer of an information processing apparatus having a displayer and an inputter to function as: an information displayer which displays a predetermined displayed portion out of information being made up of a plurality of displayed portions on the displayer; a previous/next displayed portion displayer which, when there is a previous to or next displayed portion previous to or next to the predetermined displayed portion, displays a part of the previous or next displayed portion on the displayer; and a display switcher which switches the predetermined displayed portion displayed on the displayer to the previous or next displayed portion displayed by the previous/next displayed portion displayer in response to an input from the inputter.

In the first invention, a computer of an information processing apparatus having a displayer and an inputter functions as an information displayer, a previous/next displayed portion displayer and a display switcher by an information processing program. The information displayer displays a predetermined displayed portion out of information being made up of a plurality of displayed portions on the displayer. The previous/next displayed portion displayer, when there is a previous or next displayed portion previous to or next to the predetermined displayed portion, displays a part of the previous or next displayed portion on the displayer. The display switcher switches the predetermined displayed portion displayed on the displayer to the previous or next displayed portion displayed by the previous/next displayed portion displayer in response to an input from the inputter.

According to the first invention, by displaying a part of the previous and next displayed portion, it is possible to visually easily know that there are displayed portions that can be displayed previous to and next to the predetermined displayed portion displayed on the displayer.

Here, if the plurality of displayed portions have a ring structure connecting the last displayed portion and the first displayed portion, the previous/next displayed portion displayer may display the first displayed portion as a displayed portion next to the last displayed portion, and display the last displayed portion as a displayed portion previous to the first displayed portion. In this case as well, it is possible to know that there is information to be displayed previous or next thereto.

A second invention is a storage medium storing an information processing program according to the first invention, wherein the information processing program causes the computer to further function as: a displayed portion determiner which determines that there is a previous or next displayed portion previous to or next to the predetermined displayed portion, wherein the previous/next displayed portion displayer which, when the displayed portion determiner determines that there is a previous or next displayed portion, displays a part of the previous or next displayed portion.

In the second invention, the computer further functions as a displayed portion determiner by the information processing program. The displayed portion determiner determines that there is a previous or next displayed portion previous to or next to the predetermined displayed portion, and the previous/next displayed portion displayer, when the displayed portion determiner determines that there is a previous or next displayed portion, displays a part of the previous or next displayed portion.

According to the second invention, whether or not there is a previous or next displayed portion is determined, and therefore, if it is determined that there is a previous or next displayed portion, a part of the previous or next displayed portion is displayed on the displayer while if it is determined that there is no, it is possible to change a displayed content and a displaying method on the displayer like the third invention described later.

A third invention is a storage medium storing an information processing program according to the second invention, wherein the previous/next displayed portion displayer displays neither part of the plurality of displayed portions as the previous/next displayed portion when the displayed portion determiner determines that there is no previous or next displayed portion.

Here, the previous/next displayed portion displayer can clearly show that there is no previous or next displayed portion by performing a blackout display, or displaying a message that there is no previous or next displayed portion, for example, in place of not displaying the previous and next displayed portions.

According to the third invention, it is easily know whether or not there is the information to be displayed previous to and next to the information displayed on the screen.

A fourth invention is a storage medium storing an information processing program according to the first invention, wherein the displayer has a first displayer and a second displayer having a display region larger than that of the first displayer, the information displayer displays the predetermined displayed portion at the entire display region of the first displayer and at a region corresponding to a size of the display region of the first displayer out of the display region of the second displayer, and the previous/next displayed portion displayer displays the part of the previous or next displayed portion at an area except for the area corresponding to the size of the display region of the first displayer out of the display region of the second displayer.

Here, the "display region larger than that of the first displayer" means that at least one of the height and width is large. The "region corresponding to a size of the display region of the first displayer out of the display region of the second displayer" means a region within the display region of the second displayer having the height and width the same as at least any one of the height and width of the display region of the first displayer, and does not mean the region having the area the same as that of the display region of the first displayer.

According to the fourth invention, the predetermined displayed portion is displayed on the two screens different in size, and the previous and next displayed portions are displayed at the portions caused due to the difference in size, and therefore, the predetermined displayed portion can be displayed at the two display portions, and the previous and next displayed portions can be displayed at the blank potion caused due to the size difference between the two displayer, capable of displaying more information. Thus, an effective displaying method when the two displayers different in size are utilized can be implemented.

A fifth invention is a storage medium storing an information processing program according to the first invention, wherein the displayer includes a first displayer and a second displayer having a display region larger in width than the first displayer, the first displayer and the second displayer are arranged such that the respective display regions are vertically positioned, the information displayer displays the predetermined displayed portion at the entire display region of the first displayer and at a central region having a width the same as that of the display region of the first displayer out of the display region of the second displayer, and the previous/next displayed portion displayer which displays a part of the previous displayed portion at any one of right and left regions except for the central region of the second displayer, and displays a part of the next displayed portion at the other of right and left regions of the second displayer.

According to the fifth invention, the two screens are different in size in the width direction of the screen, the predetermined displayed portion can be displayed at the two display portions, and the previous and next displayed portions can be displayed at the right and left blank potions caused due to the difference in width. Thus, more information can be displayed, and the existence of the previous and next displayed portions previous to and next to the displayed predetermined displayed portion can intuitively be recognized.

A sixth invention is a storage medium storing an information processing program according to the fifth invention, wherein the first displayer and the second displayer are arranged such that center points of the respective display regions are on the same vertical line.

According to the sixth invention, the first displayer and the second displayer are vertically arranged along the same vertical line, so that the central region and the right and left regions are arranged on the second displayer in a well-balanced manner.

A seventh invention is a storage medium storing an information processing program according to the first invention, wherein the displayer includes a first displayer and a second displayer, the information displayer displays the part of the predetermined displayed portion on the first displayer, and displays the other part of the predetermined displayed portion at a main region of the second displayer, and the previous/next displayed portion displayer displays the part of the previous or next displayed portion at a sub region of the second displayer.

An eighth invention is a storage medium storing an information processing program according to the seventh invention, wherein the information processing program causes the computer to further function as a scrolling processor which scrolls the part of the predetermined display region displayed on the first displayer and the other part of the predetermined displayed portion displayed at the main region of the second displayer in conjunction with each other in response to an input for designating scrolling.

A ninth invention is a storage medium storing an information processing program according to the eighth invention, wherein in an object to be processed by the scrolling processor, the part of the predetermined display region displayed on the first displayer and the other part of the predetermined displayed portion displayed on the main region of the second displayer are included, and the previous or next displayed portion displayed at the sub region of the second displayer is not included.

A tenth invention is a storage medium storing an information processing program according to the first invention, wherein the inputter includes a first inputter for designating display switching and a second inputter for designating scrolling, the information displayer displays a part of region out of the predetermined displayed portion having a region larger than the displayer in a first direction on the displayer, and the previous/next displayed portion displayer displays the part of the previous or next displayed portion in a second direction different from the first direction as seen from the predetermined displayed portion displayed by the information displayer, the display switcher switches the predetermined displayed portion displayed on the displayer to the previous or next displayed portion displayed by the previous/next displayed portion displayer in response to a first input from the first inputter, and the information processing program causes the computer to further function as: a scrolling processor which scrolls such that the other region of the predetermined displayed portion is displayed on the displayer in response to an input from the second inputter.

In the tenth invention, a computer further functions as a scrolling processor by an information processing program. An inputter includes a first inputter for designating display switching and a second inputter for designating scrolling, the information displayer displays a part of region out of the predetermined displayed portion having a region larger than the displayer in a first direction on the displayer, and the previous/next displayed portion displayer displays the part of the previous or next displayed portion in a second direction different from the first direction as seen from the predetermined displayed portion displayed by the information displayer. The display switcher switches the predetermined displayed portion displayed on the displayer to the previous or next displayed portion displayed by the previous/next displayed portion displayer in response to a first input from the first inputter, and a scrolling processor scrolls such that the other region of the predetermined displayed portion is displayed on the displayer in response to an input from the second inputter.

According to the tenth invention, by the first inputter (touch/button/pad input designating the first direction, for example), the displayed portion is switched, and by the second inputter (touch/button/pad input designating the second direction, for example), the displayed portion is scrolled, so that, switching and scrolling the displayed portion can be performed by an intuitive operation.

An eleventh invention is a storage medium storing an information processing program according to the tenth invention, wherein in an object to be processed by the scrolling processor, the entire display region of the first displayer and the predetermined displayed portion displayed at the central region out of the display region of the second displayer are included, and the previous or next displayed portion information displayed at the right and left regions of the second displayer is not included.

According to the eleventh invention, only the central displayed portion from which the content is to be read is scrolled, and the right and left displayed portions from which the existence is only necessary to be found is fixed, so that it is possible to perform an effective and good looking scroll.

A twelfth invention is a storage medium storing an information processing program according to the eleventh invention, wherein the previous/next displayed portion displayer, in a case that the predetermined displayed portion displayed on the displayer by the information displayer is in a scrolled state by the scrolling processor before a switch by the display switcher, displays the predetermined displayed portion in a scrolled manner.

According to the twelfth invention, the information scrolled when it is at the center is displayed in a scrolled manner after movement to right and left (the scrolled state is maintained), capable of implementing a switch of a natural display. Furthermore, it is possible to easily know whether or not the pages displayed on the right and left is in the scrolled state.

A thirteenth invention is a storage medium storing an information processing program according to the tenth invention, wherein the information displayer, in a case that the previous or next displayed portion displayed by the previous/next displayed portion displayer before a current switch by the display switcher is in a scrolled manner by the scrolling processor when it is displayed on the displayer by the information displayer before a previous switch, returns the information corresponding to the previous or next displayed portion to the scrolled state and displays the same.

According to the thirteenth invention, when the information scrolled when it is at the center is moved to right and left by the switching, and returned to the center by another switching, the information returns to the original scrolled state, and therefore, it is easily find the information previously noted.

A fourteenth invention is a storage medium storing an information processing program according to the first invention, wherein the information is an electronic file being made up of a plurality of pages.

A fifteenth invention is an information processing apparatus comprising: a displayer; an inputter; an information displayer which displays a predetermined displayed portion out of information being made up of a plurality of displayed portions on the displayer; a previous/next displayed portion displayer which, when there is a previous or next displayed portion previous to or next to the predetermined displayed portion, displays a part of the previous or next displayed portion on the displayer; and a display switcher which switches the predetermined displayed portion displayed on the displayer to the previous or next displayed portion displayed by the previous/next displayed portion displayer in response to an input from the inputter.

A sixteenth invention is an information processing system comprising: a displayer; an inputter; an information displayer which displays a predetermined displayed portion out of information being made up of a plurality of displayed portions on the displayer; a previous/next displayed portion displayer which, when there is a previous or next displayed portion previous to or next to the predetermined displayed portion, displays a part of the previous or next displayed portion on the displayer; and a display switcher which switches the predetermined displayed portion displayed on the displayer to the previous or next displayed portion displayed by the previous/next displayed portion displayer in response to an input from the inputter.

A seventeenth invention is an information processing method comprising: an information displaying step for displaying a predetermined displayed portion out of information being made up of a plurality of displayed portions on the displayer; a previous and next displayed portion displaying step for, when there is a previous or next displayed portion previous to or next to the predetermined displayed portion, displaying a part of the previous or next displayed portion on the displayer; and a display switching step for switching the predetermined displayed portion displayed on the displayer to the previous or next displayed portion displayed by the previous/next displayed portion displayer in response to an input from the inputter.

In each of the fifteenth to seventeenth inventions, similar to the first invention, it is possible to visually easily know that there is displayed portion that can be displayed previous to or next to the predetermined displayed portion displayed on the displayer.

According to the present invention, it is possible to implement a storage medium storing an information processing program, an information processing apparatus, an information processing system and an information processing method capable of easily know that there is information to be displayed previous to or next to the information displayed on the screen.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2(A) shows a top surface in a close state, FIG. 2(B) shows a left side surface in the close state, FIG. 2(C) is a front surface in the close state, FIG. 2(D) is a right side surface in the close state, FIG. 2(E) shows a back surface in the close state, and FIG. 2(F) shows a bottom surface in the closed state;

FIG. 6(A) shows a state that a parallax barrier is turned on (3D display), and FIG. 6(B) shows a state that a parallax barrier is turned off (2D display);

FIG. 11(A) shows an example when no display is performed after a last page (right area is blacked out), and FIG. 11(B) shows an example when a first page is displayed after the last page;

FIG. 12(A) shows an example when no display is performed before the first page (left area is blacked out), and FIG. 12(B) shows an example when the last page is displayed after the first page;

FIG. 13(A) shows a part of the memory map of the main memory, and FIG. 13(B) shows a part of the memory map of a NAND flash memory;

DETAILED DESCRIPTION OF THE PREFERRED EMBODIMENTS

Figure 1:
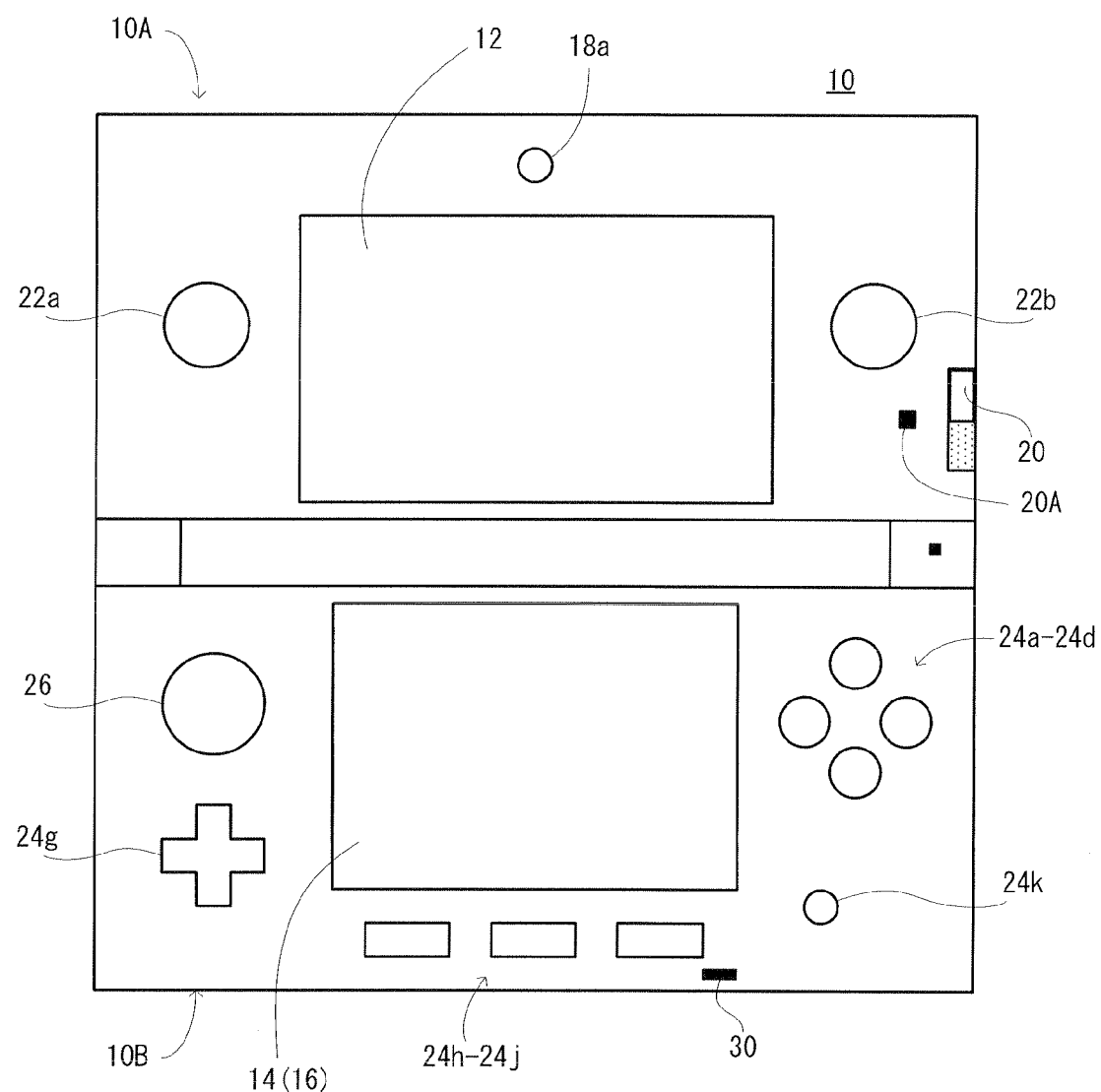
FIG. 1 is an external view of a game apparatus of one embodiment of the present invention, and shows a top surface in an open state.
Figure 2:
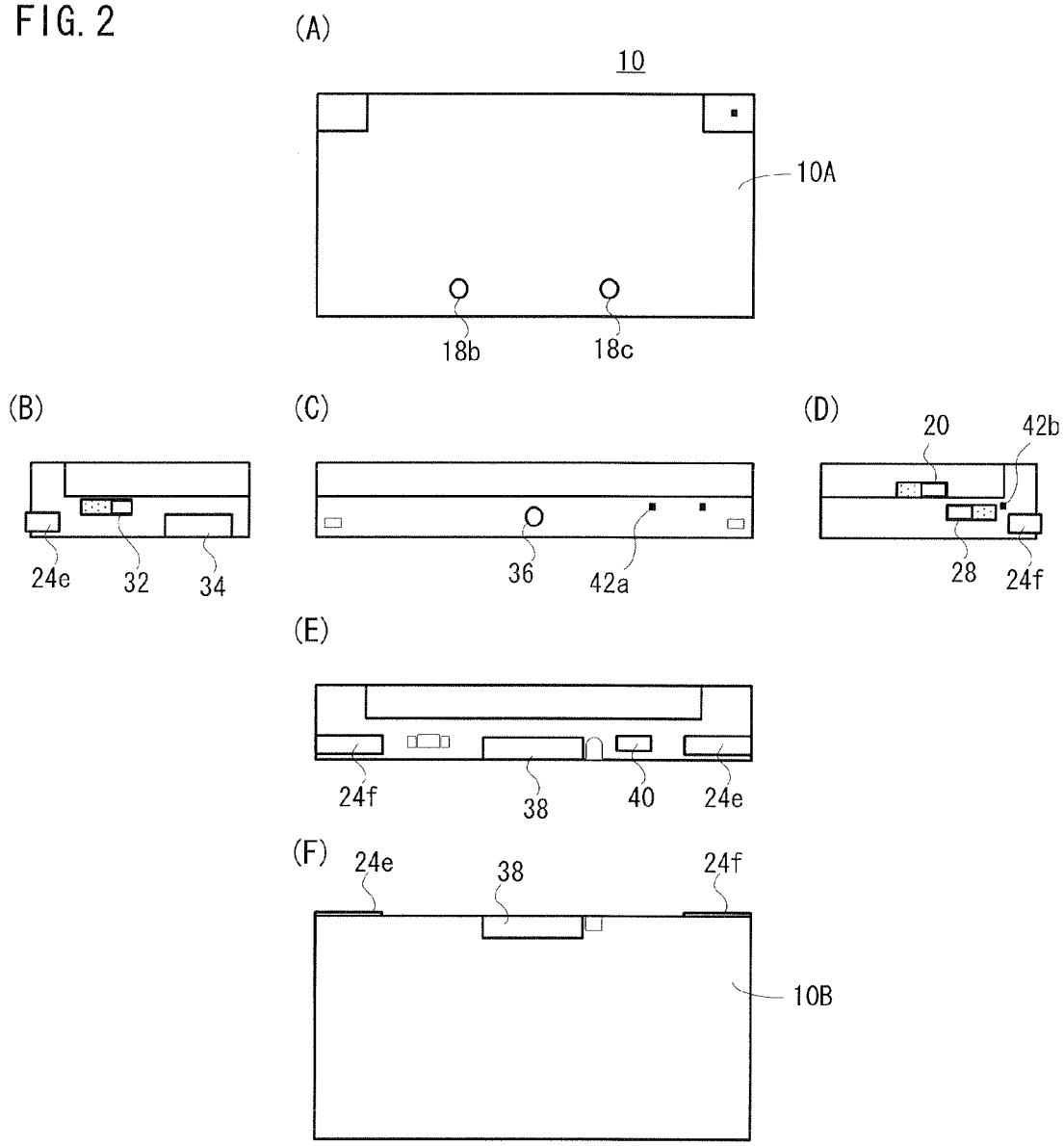
FIG. 2 is an external view of the game apparatus.

In FIG. 1 and FIG. 2, an appearance of a game apparatus 10 of one embodiment of the present invention is shown. The game apparatus 10 is a foldable game apparatus. FIG. 1 shows a top view of the game apparatus 10 in an open state, FIG. 2 (A) to FIG. 2 (F) respectively show a top surface, a left side surface, a front surface, a right side surface, a back surface and a bottom surface of the game apparatus 10 in a closed state.

The game apparatus 10 has an upper housing 10A and a lower housing 10B rotatably connected with each other as shown in FIG. 1, and on a top surface of the upper housing 10A, a stereoscopic LCD 12 compliant with an autostereoscopic display, an inward camera 18a, a 3D adjusting switch 20, a 3D lamp 20A, right and left speakers 22a and 22b, etc. are provided. On a top surface of the lower housing 10B, a lower LCD 14 attached with touch panel 16, A, B, X, Y buttons 24a-24d, a cross key (up, down, right and left button) 24g, home, select, start buttons 24h-24j, a power button 24k, an analog pad 26, and a microphone 30 are provided.

Furthermore, as shown in FIG. 2(A), on a top surface of the game apparatus 10 (reverse side of the upper housing 10A shown in FIG. 1), right and left outward cameras 18b and 18c compliant with 3D imaging are provided. Furthermore, as shown in FIG. 2(C), on a front surface of the game apparatus 10, a headphone terminal 36, a power lamp 42a, etc. are provided. Also, as shown in FIG. 2(B), FIG. 2(E) and FIG. 2(D), from a left side surface to a back surface of the game apparatus 10, an L button 24e is provided, and from a right side surface to a back surface, an R button 24f is provided. Moreover, on the left side surface of the game apparatus 10, a volume control switch 32, an SD card slot 34, etc. are provided, and on the right side surface of the game apparatus 10, a wireless switch 28, a wireless lamp 42b, etc. are provided. The above-described 3D adjusting switch is exposed from the right side surface. In addition, on the back surface of the game apparatus 10, an infrared ray emitting-receiving portion 40, etc. is provided. Then, as shown in FIG. 2(E) and FIG. 2(F), from the back surface to a bottom surface, a game card slot 38 is provided.

Figure 6:
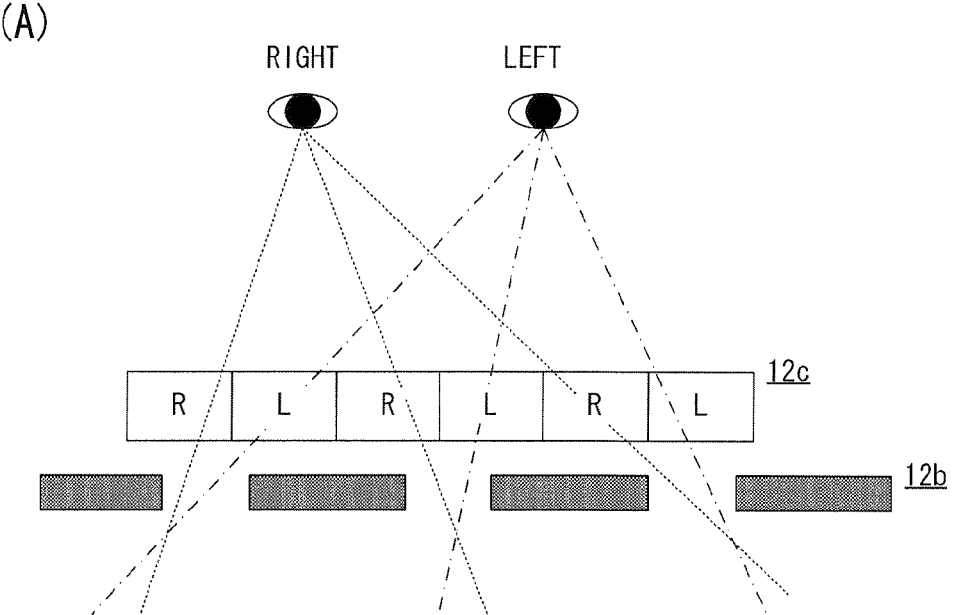
FIG. 6 is an illustrative view for explaining a principle of a 3D/2D display in a parallax barrier system.
Figure 6:
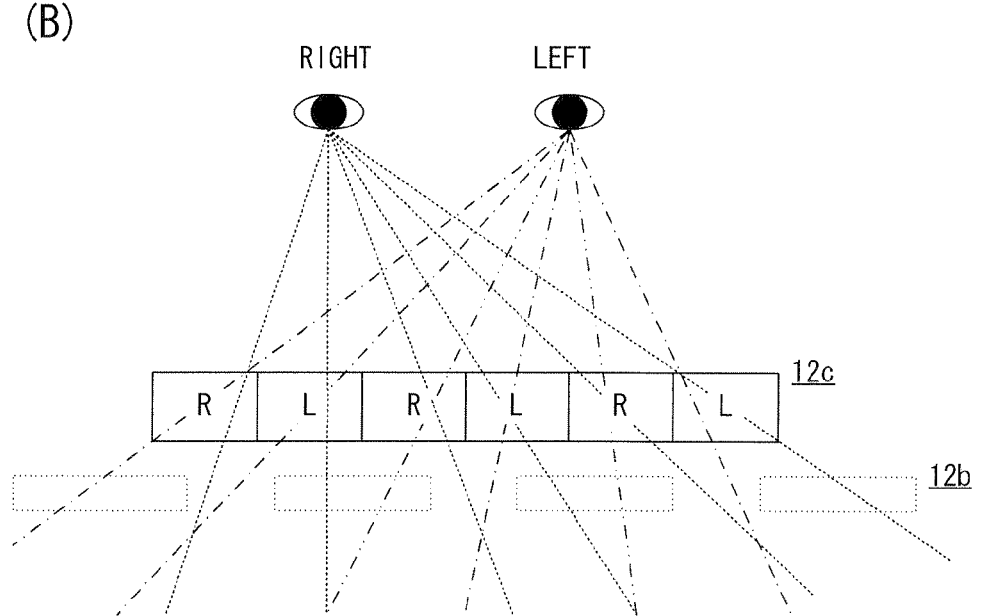

The stereoscopic LCD 12 is a 3D liquid crystal (see FIG. 6) according to a parallax barrier system, and displays a stereoscopic image without any glasses (autostereoscopic image). On the stereoscopic LCD 12, by turning a parallax barrier of the liquid crystal off, a planar image display is also made possible. It should be noted that a lenticular system utilizing a sheet with concaves/convexes (lenticular lens) and other autostereoscopic 3D systems may be adopted without being restricted to the parallax barrier system.

The inward camera 18a images a planar image (2D image) while the outward cameras 18b and 18c image stereoscopic images (3D image). A 2D or 3D image imaging the player can be used as an image input to a game program (72: described later). In this case, the game program 72 detects movements of a face, a hand and a gazing direction (direction of eyeballs) of the player by performing image recognition, and executes processing corresponding to the detection result. The 2D image by the inward camera 18a can be displayed on the lower LCD 14, and the 3D images by the outward cameras 18b and 18c can be displayed on the stereoscopic LCD 12.

Figure 3:
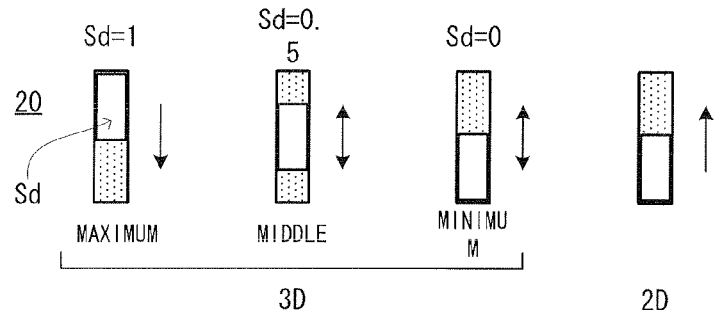
FIG. 3 is an illustrative view for explaining an operation of a 3D adjusting switch.

The 3D adjusting switch 20 is a slide switch for manually switching the display of the stereoscopic LCD 12 between the 3D display and the 2D display, and for manually adjusting a three-dimensional effect in the 3D display as well, and operates as shown in FIG. 3, for example. The three-dimensional effect of the 3D display becomes a maximum (Sd=1) when the slider Sd is at an upper end, decrease as the slider Sd is moved down, and becomes a minimum (Sd=0) when at a lower end in this embodiment. Then, the 3D display changes to the 2D display when the slider Sd is moved to the down end.

Although the detailed description is omitted, such a change of the three-dimensional effect of the 3D display is implemented by changing the distance (distance-between cameras) between the right and left virtual cameras arranged within the virtual space. That is, according to an operation of the 3D adjusting switch 20, the distance-between cameras D is adjusted. The distance-between cameras receives an automatic adjustment by the game program 72 as well as the manual adjustment.

The 3D lamp 20A is a lamp showing a displaying condition of the stereoscopic LCD 12, and lights up in the 3D display and light off in the 2D display. Here, it may be changed in brightness and color in correspondence with the degree of the 3D display (intensity of the three-dimensional effect) as well as it merely lights up and off.

An operation to the touch panel 16, the A, B, X, Y buttons 24a-24d, the cross key (button) 24g, the home, select, start buttons 24h-24j, or the analog pad 26 is used as a touch/button/pad input to the game program 72. The power button 24k is used for turning on or off the power of the game apparatus 10. The power lamp 42a lights up or off in conjunction with the power-on or the power-off of the power source.

The microphone 30 converts a user speech voice, an environmental sound, etc. to sound data. The sound data can be used as a sound input to the game program 72. In this case, the game program 72 detects the speech voice by the player by performing voice recognition, and executes processing according to the detection result. The sound data by the microphone 30 can be further recorded in a NAND-type flash memory 48 (see FIG. 4), etc.

The speakers 22a and 22b output a game voice, a microphone voice, etc. To the headphone terminal 36, a headphone not shown is connected. The volume control switch 32 is a slide switch for adjusting volumes of the speakers 22a and 22b or an output from the headphone terminal 36.

The SD card slot 34 is attached with an SD memory card (not illustrated) for storing a camera image, a microphone sound, etc., and the game card slot 38 is attached with a game card (not illustrated) storing the game program 72, etc. The infrared ray emitting-receiving portion 40 is utilized for infrared rays (IR) communications with another game apparatus.

Figure 4:
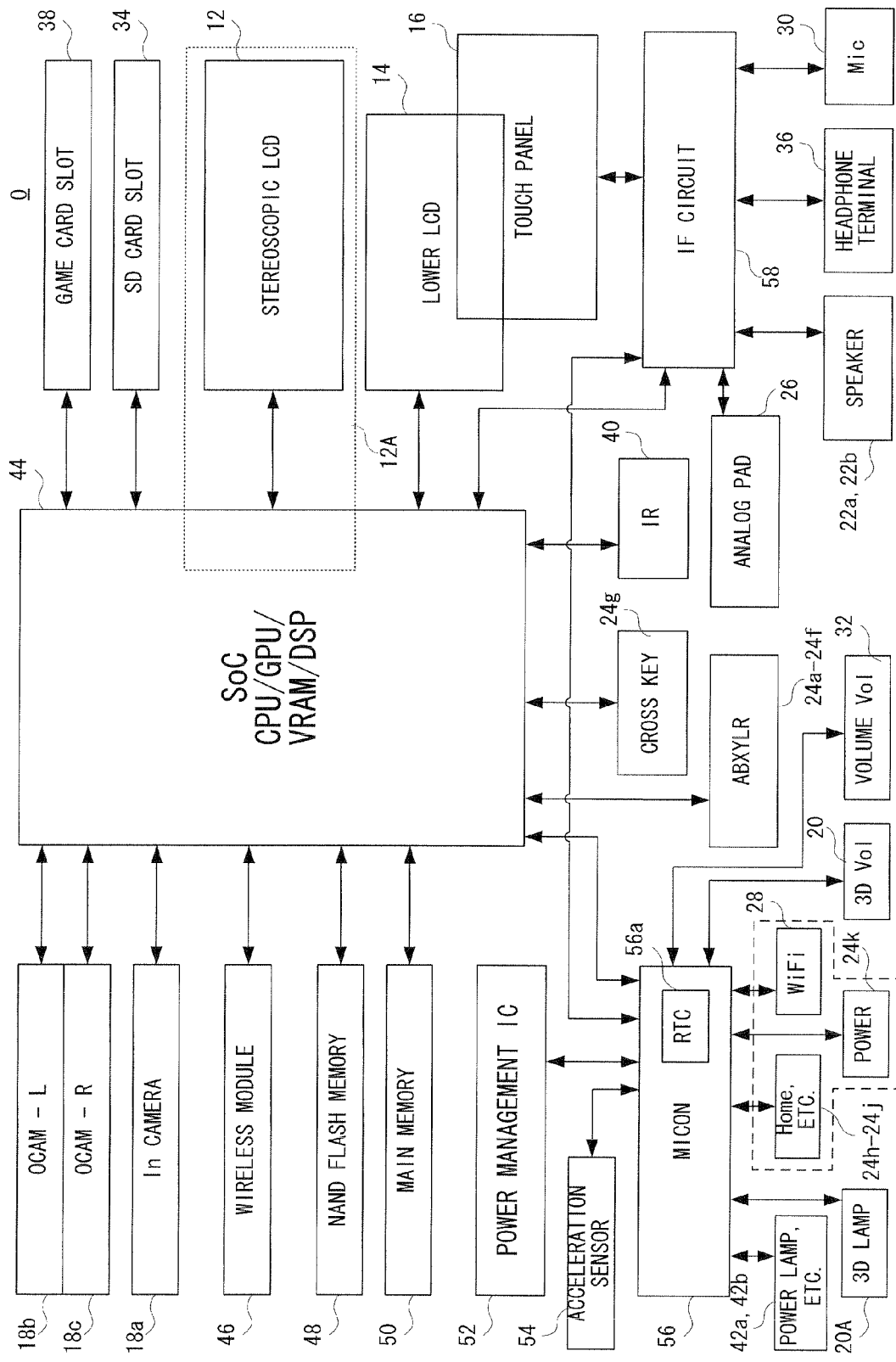
FIG. 4 is a block diagram showing one example of an electric configuration of the game apparatus.

FIG. 4 shows an electric configuration of the game apparatus 10. The game apparatus 10 includes an SoC (System-on-a-Chip) 44 being made up of a CPU, a GPU, a VRAM, a DSP, etc. The SoC 44 is connected with the above-described stereoscopic LCD 12, lower LCD 14, inward camera (In camera) 18a, right and left outward cameras (OCAM-L and OCAM-R) 18b and 18c, A, B, X, Y, L, R buttons 24a-24f, cross button 24g, SD card slot 34, game card slot 38, and infrared ray emitting-receiving portion (IR) 40. The SoC 44 is further connected with the above-described 3D adjusting switch (3D Vol) 20, 3D lamp 20A, home, select, start buttons 24h-24j, power button (Power) 24k, wireless switch (WiFi) 28, volume control switch (volume Vol) 32, and power, wireless lamps 42a, 42b via a microcomputer (hereinafter referred to as "micon") 56. The SoC 44 is moreover connected with the above-described touch panel 16, right and left speakers 22a and 22b, analog pad 26, microphone (Mic) 30 and headphone terminal 36 via an IF circuit 58.

In addition, the SoC 44 is connected with a wireless module 46, the NAND-type flash memory 48 and a main memory 50 as elements other than the above description. The wireless module 46 has a function of connecting to a wireless LAN. The NAND-type flash memory 48 stores data for saved, such as a camera image, a microphone voice, etc. or various databases for game (electronic operating guide, for example). The main memory 50 gives a working area to the SoC 44. That is, in the main memory 50, various data and programs to be used in the game are stored, and the SoC 44 performs works by utilizing the data and program stored in the main memory 50.

The micon 56 is connected with a power source management IC 52 and an acceleration sensor 54. The power source management IC 52 performs a power source management of the game apparatus 10, and the acceleration sensor 54 detects accelerations in the three-axis directions of the game apparatus 10. The detection result of the acceleration sensor 54 can be used as a motion input to the game program 72. In this case, the game program 72 calculates a motion of the game apparatus 10 itself on the basis of the detection result, and executes processing according to the calculation result. Furthermore, the micon 56 includes an RTC (real-time clock) 56a, and counts a time by the RTC 56a to supply the same to the SoC 44.

Figure 5:
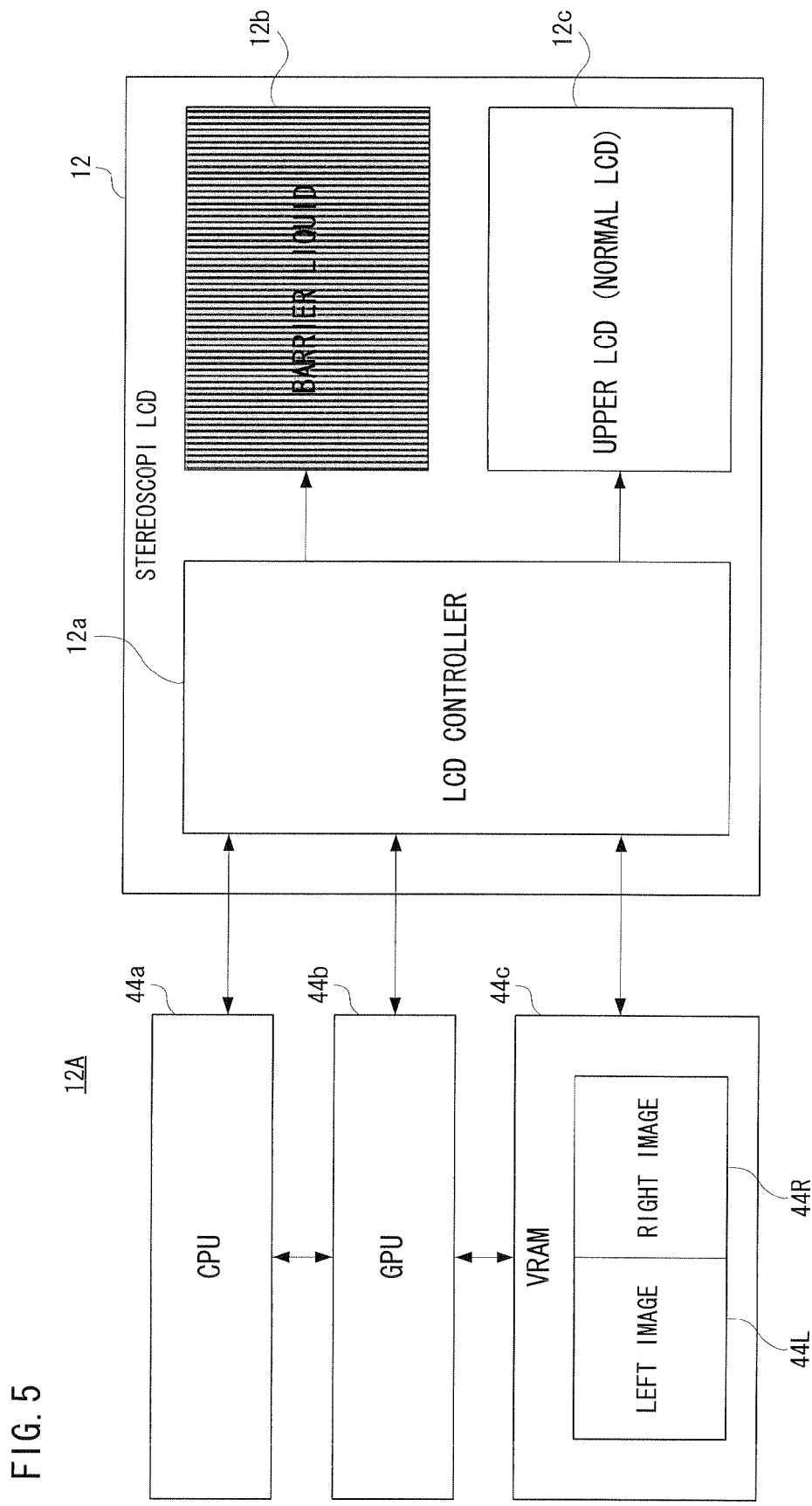
FIG. 5 is a block diagram showing a main part (stereoscopic LCD controller being formed of a stereoscopic LCD and a part of SOc) of the electric configuration in FIG. 4.

FIG. 5 shows a stereoscopic LCD controller 12A being made up of the stereoscopic LCD 12 and a part of the SoC 44. The stereoscopic LCD 12 includes an LCD controller 12a, a barrier liquid crystal 12b and an upper LCD 12c. The barrier liquid crystal 12b includes a plurality of liquid crystal slits extending in a vertical (row) direction as shown in FIG. 6(A), and makes the right eye and the left eye view beams passing through pixels in a different row of the upper LCD 12c by alternately cutting off the beam from the backlight by the plurality of liquid crystal slits. The upper LCD 12c may be a normal liquid crystal (for 2D display) similar to the lower LCD 14. The LCD controller 12a performs drawing on the upper LCD 12c under the control of the GPU 44b and then the CPU 44a, and turns the barrier liquid crystal 12b (applied voltage) on and off. When the barrier liquid crystal 12b is turned off, the right eye and the left eye can view the beams passing through the pixels of all the rows on the upper LCD 12c as shown in FIG. 6(B).

In the game apparatus 10 configured as described above, as a one example of an electronic file, an electronic operating guide (hereinafter referred to as "operating guide") of a game to be played can be displayed. In this embodiment, the display of the operating guide is made in a two-dimensional manner, and thus, the stereoscopic LCD 12 is referred to as "upper LCD 12".

Figure 7:
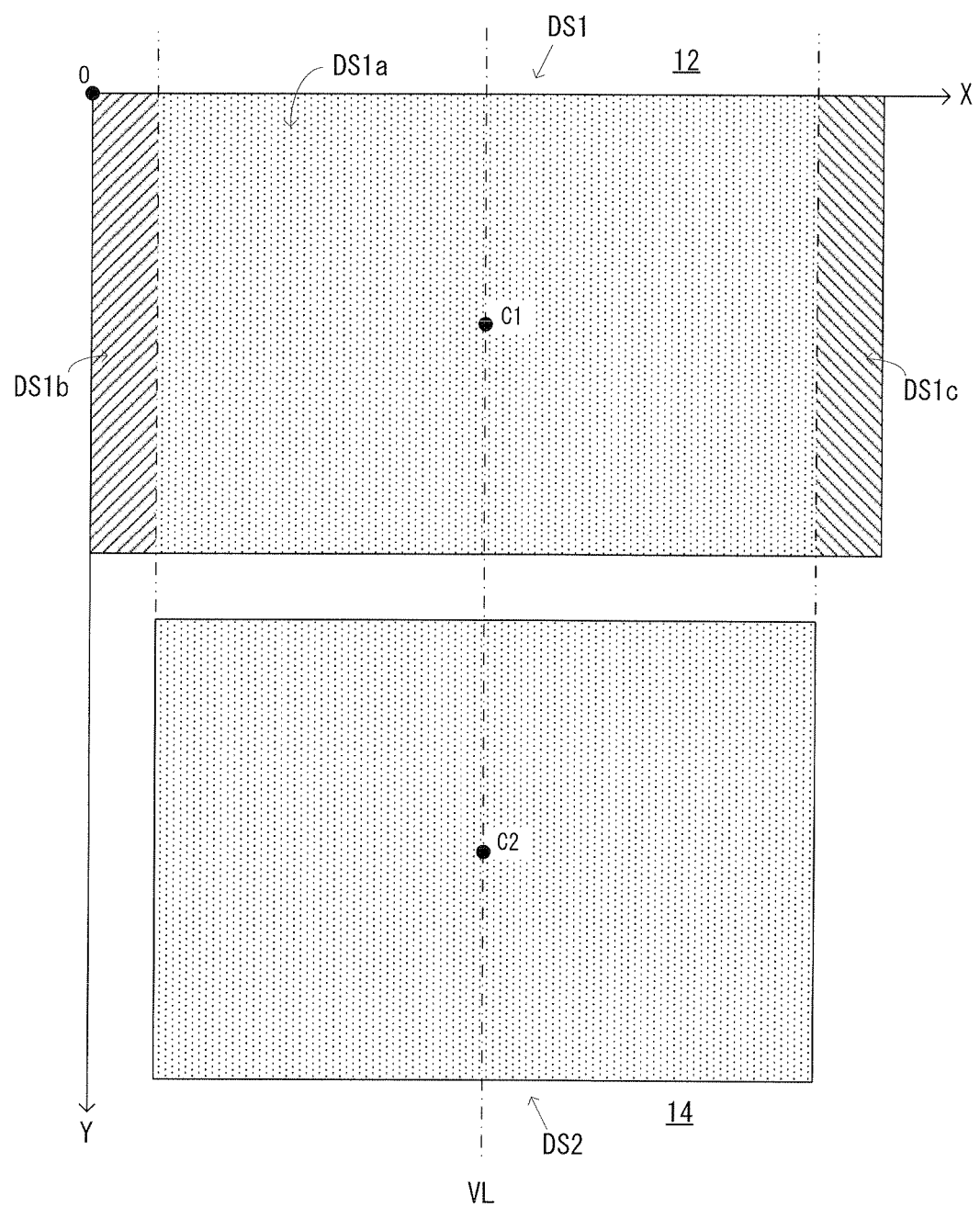
FIG. 7 is an illustrative view showing a relationship as to a size and a position of upper and lower LCDs.

First, the relationship between the upper LCD 12 and the lower LCD 14, specifically, the relationship as to the size and the position is explained in detail with reference to FIG. 7. In FIG. 7, the upper left corner of a display surface DS1 of the upper LCD 12 shall be an original point O, the horizontal right direction is defined as an X-axis, and the vertical downward direction is defined as a Y-axis. The display surface DS1 of the upper LCD 12 is relatively larger in width (horizontal size) (6:5, for example) than and approximately the same in height (vertical size) (1:1, for example) as a display surface DS2 of the lower LCD 14. Then, a center point C1 of the display surface DS1 and a center point C2 of the display surface DS2 are on the same vertical line VL.

Accordingly, the display surface DS1 of the upper LCD 12 is sectioned into a center portion DS1a (main region) positioned immediately above the display surface DS2 of the lower LCD 14 and having the same width as the display surface DS1 and a left portion DS1b and a right portion DS1c (sub region) on both sides of the center portion DS1a each having a width one tenth of the center portion DS1a. That is, the left end of the upper LCD 12 is arranged more leftward than the left end of the lower LCD 14, and the right end of the upper LCD 12 is arranged more rightward than the right end of the lower LCD 14.

Here, the relationship as to the size and the position between the upper LCD 12 and the lower LCD 14 is not restricted to the aforementioned example, and can appropriately be changed. For example, the lower LCD 14 may be made large. Even if they have the same in size, if any one or both of the upper LCD 12 and the lower LCD 14 are controlled to change the size of the effective display region, a desired relationship can be implemented. Furthermore, even if the center points C1, C2 of the upper LCD 12 and the lower LCD 14 are displaced leftward or rightward from the vertical line VL more or less, an appropriate overlap may be maintained in the width direction (another modified example is described later).

Figure 8:
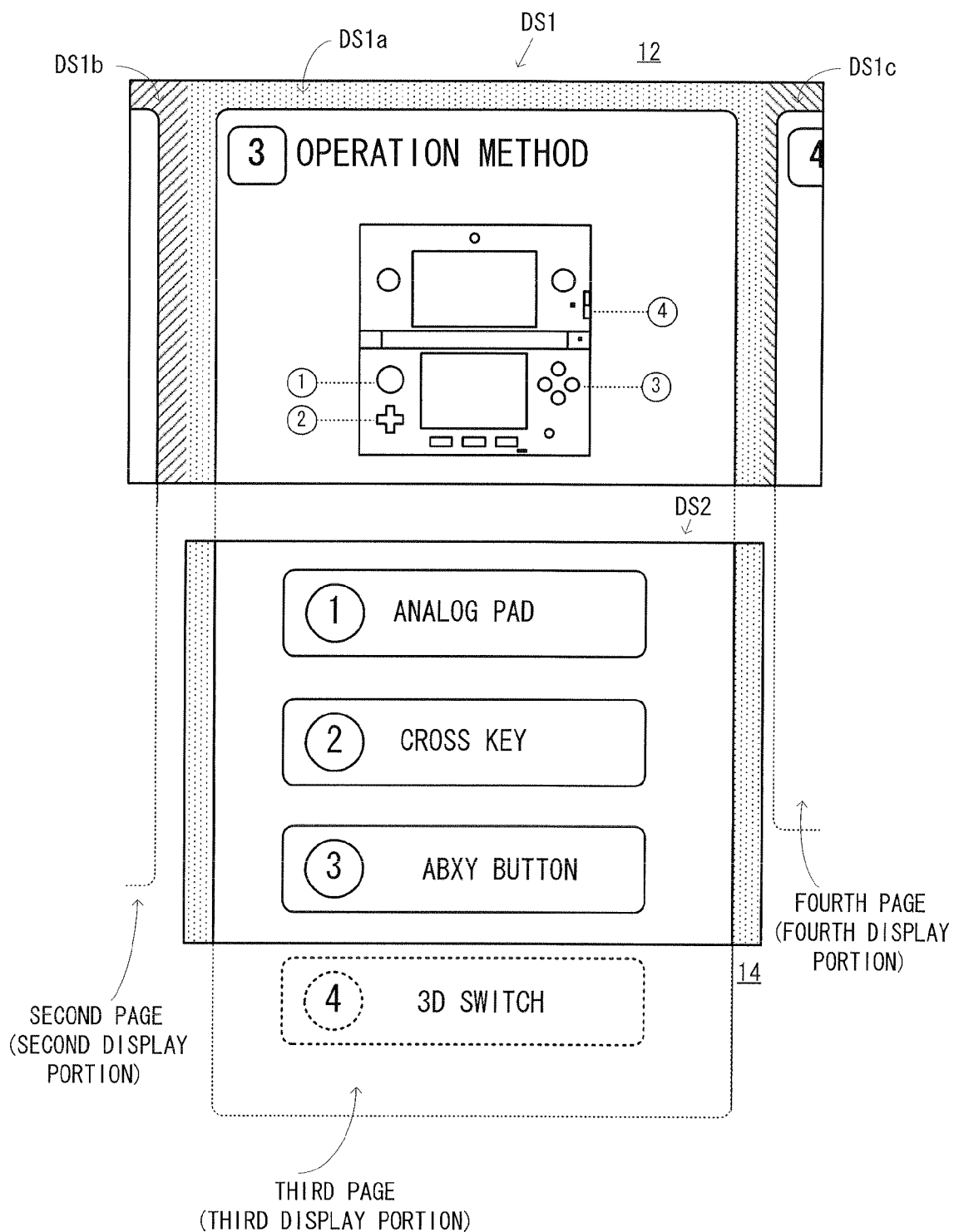
FIG. 8 is an illustrative view showing one display example (a state in which a third page is displayed) of an operating guide.
Figure 9:
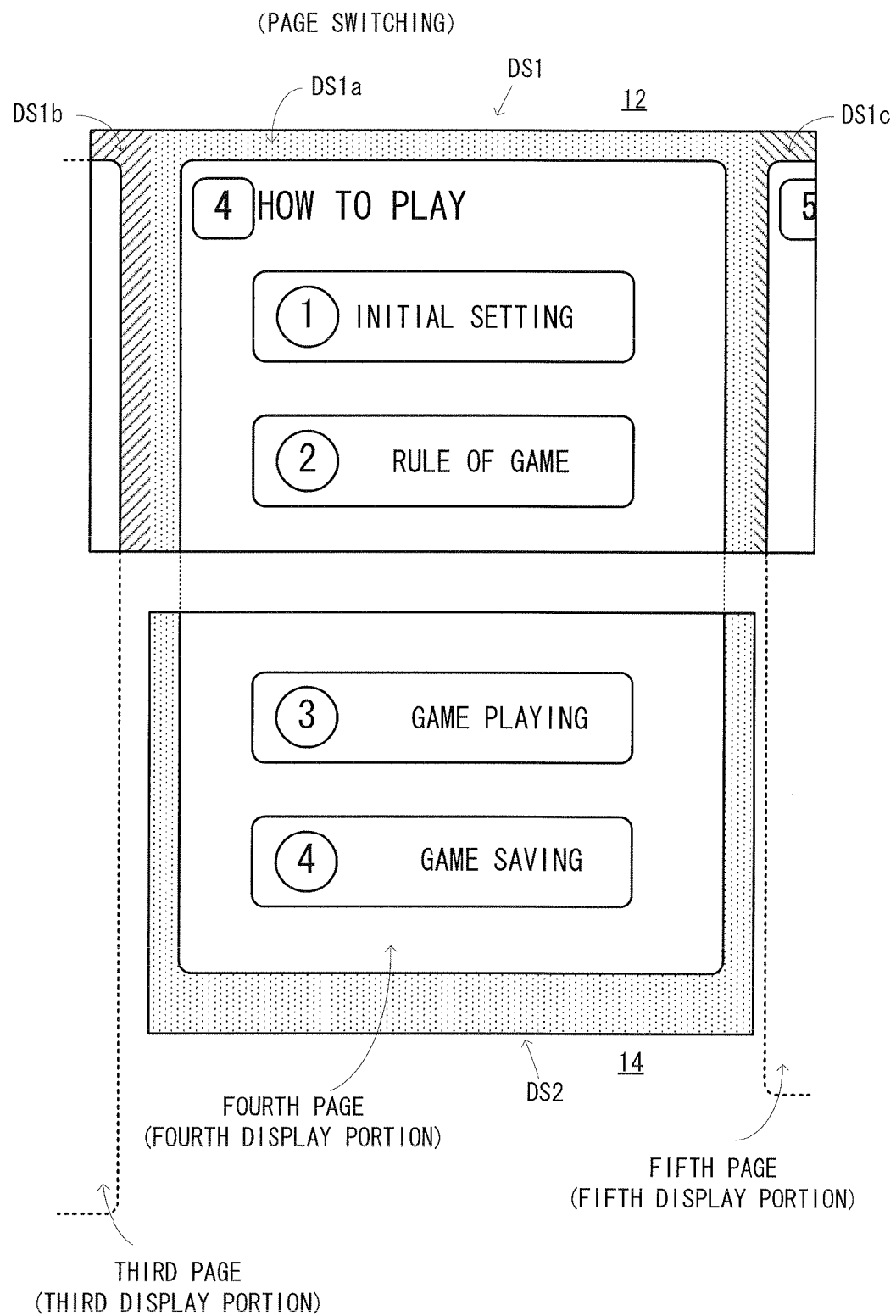
FIG. 9 is an illustrative view showing a still another display example (a display switching from the third page to a fourth page) of the operating guide.
Figure 10:
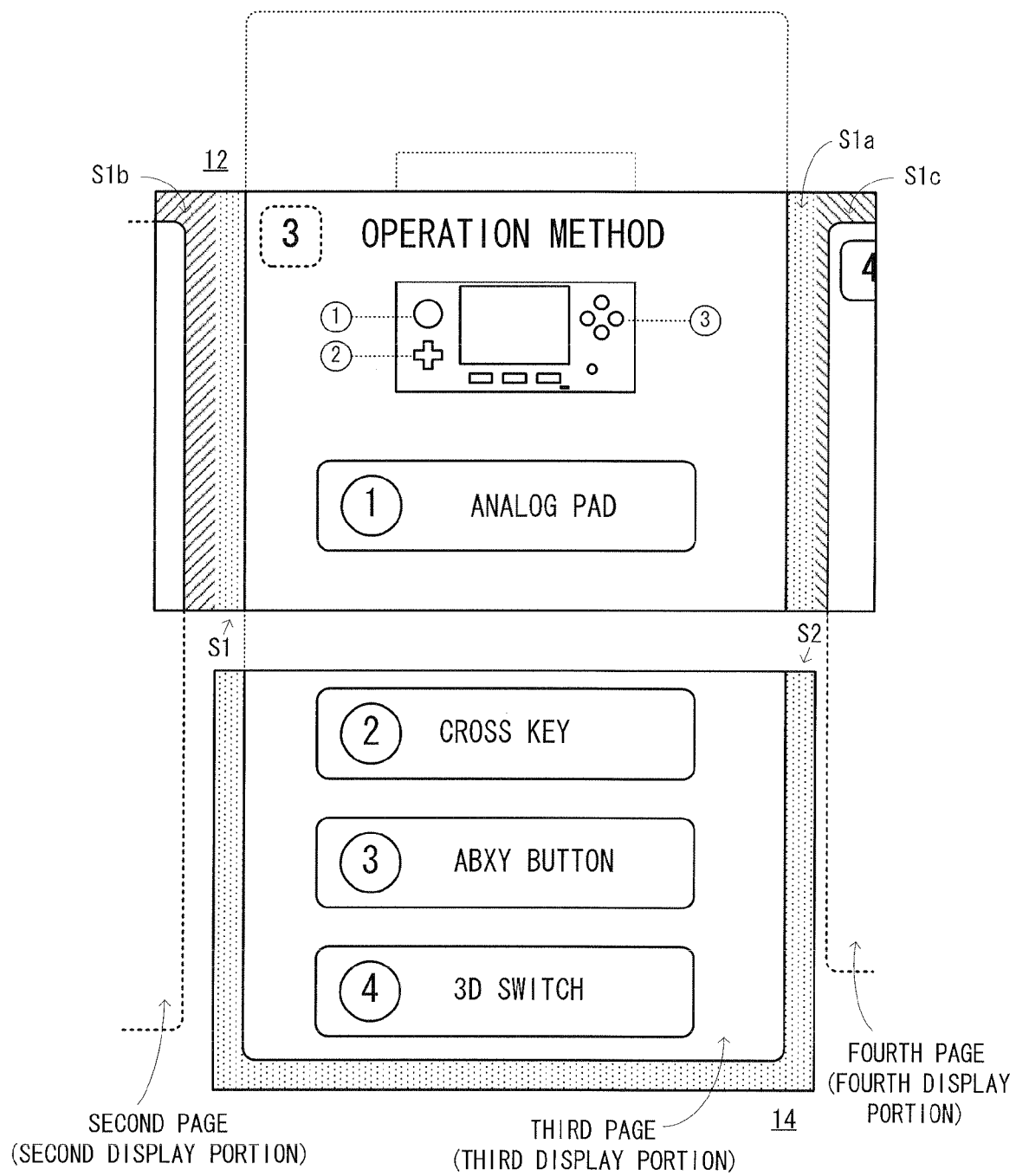
FIG. 10 is an illustrative view showing a further display example (scrolling of the third page) of the operating guide.
Figure 11:
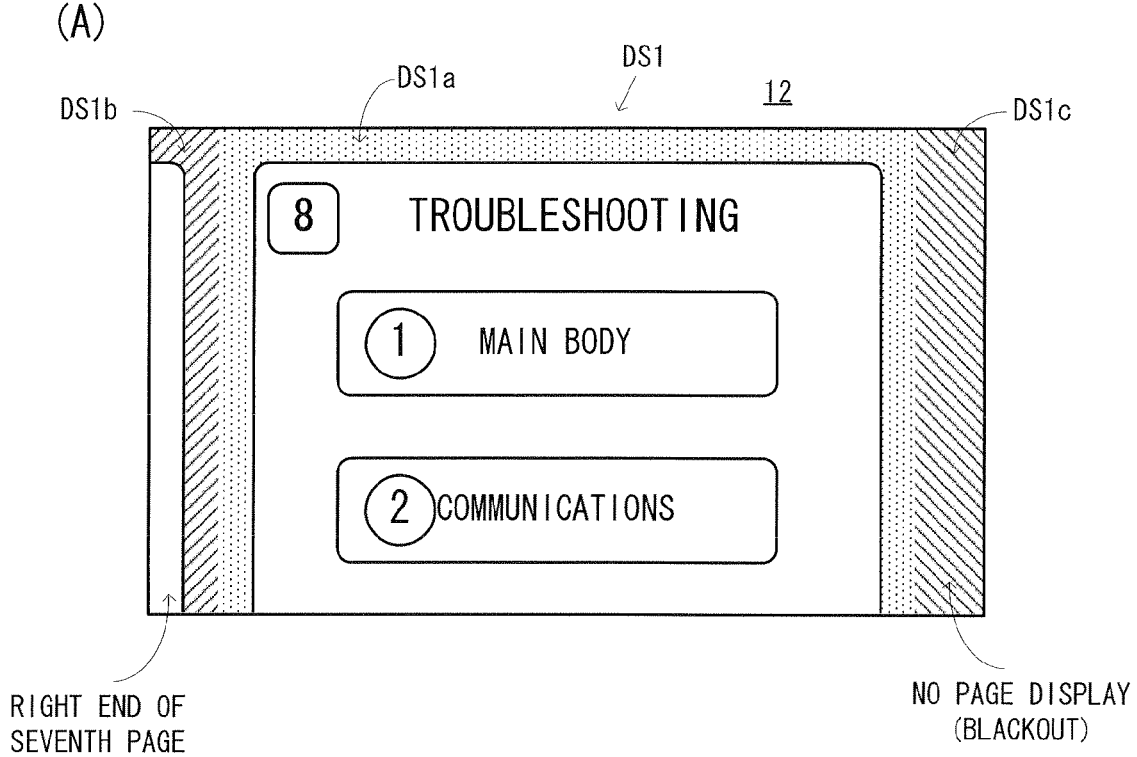
FIG. 11 is an illustrative view showing a still further display example (a state in which the last page is displayed) of the operating guide.
Figure 11:
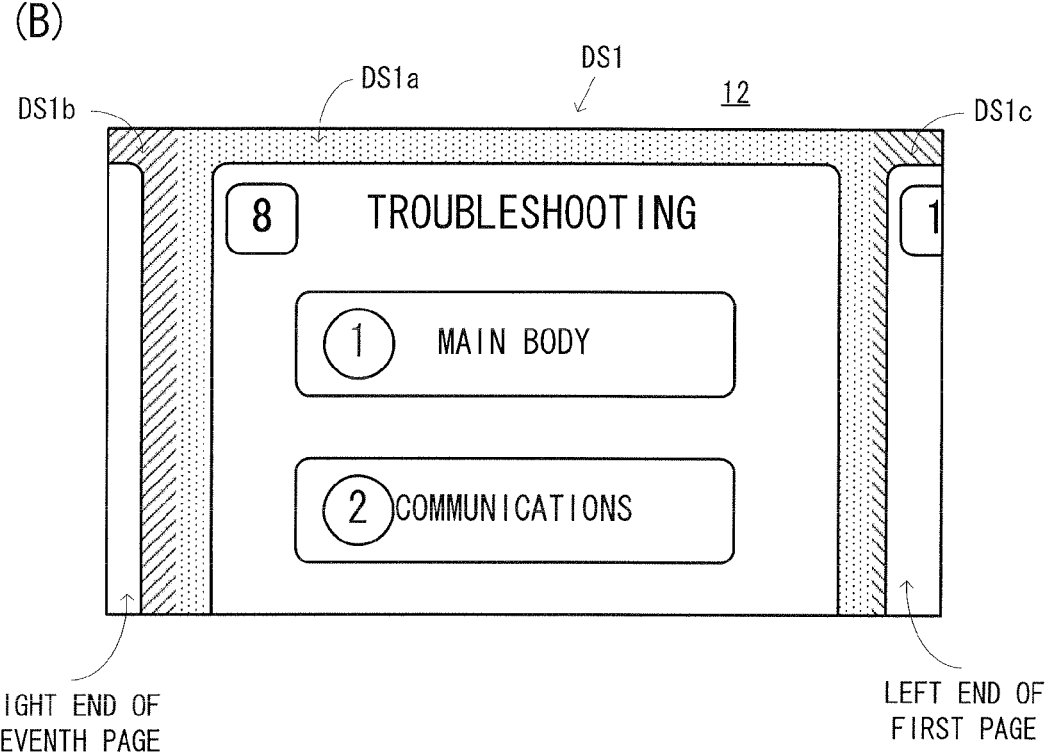
Figure 12:
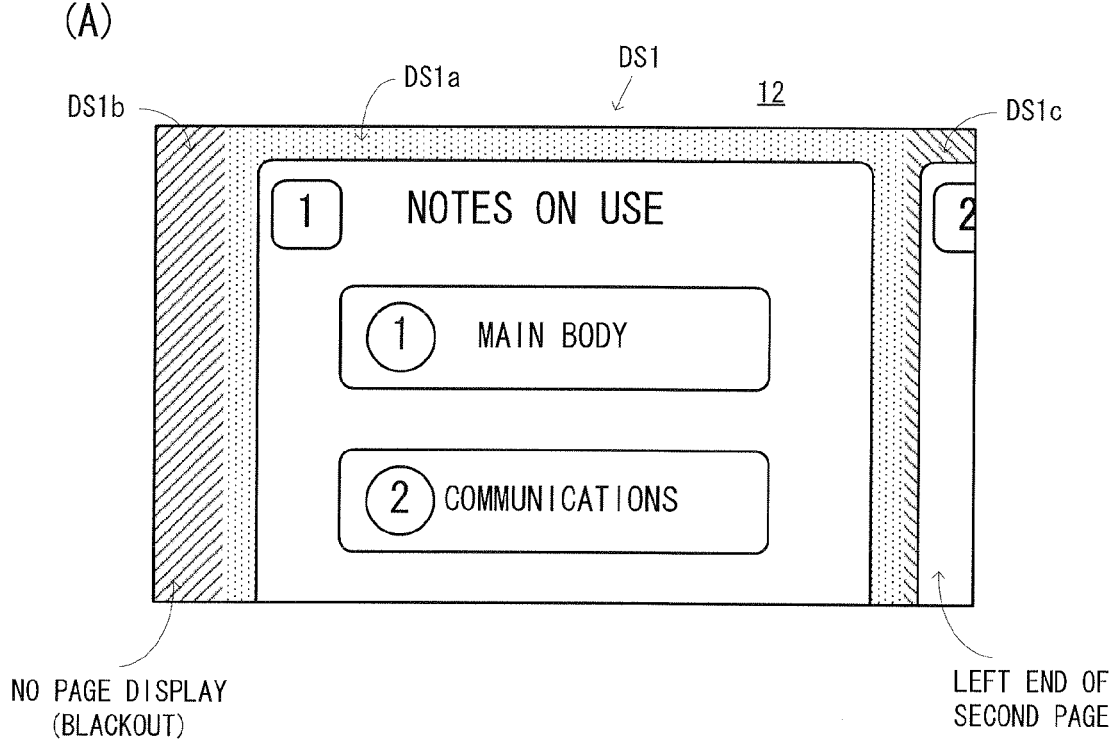
FIG. 12 is an illustrative view showing another display example (a state in which the first page is displayed) of the operating guide.
Figure 12:
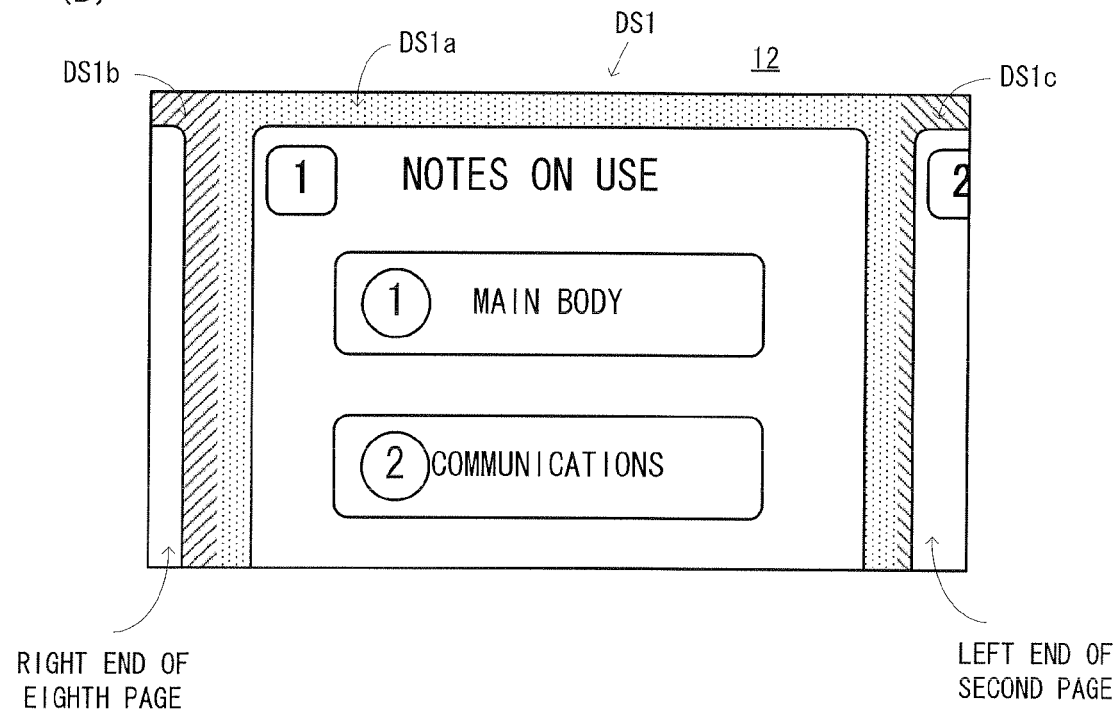

On the upper LCD 12 and the lower LCD 14 having such a relationship, guide screens as shown in FIG. 8 to FIG. 12 and FIG. 20, for example, are displayed. With reference to FIG. 8 to FIG. 12 and FIG. 20, an operating guide is first made up of a plurality of pages (or, display object, display unit, etc.), that is, first to eighth pages (first to eighth displayed portions, here), and to each page, a heading with index, such as "(3) operation method", "(4) how to play the game" is given, and a detailed explanation is described below the heading. For example, on the third page, as shown in FIG. 8, as an explanation of the "(3) operation method", the arrangement of the operating portion, such as the analog pad 26, the cross key 24g, etc. is first illustrated, and an operating method of each components of the operating portion is next described. On the next fourth page, as shown in FIG. 9, as an explanation of the "(4) how to play the game", an initial setting, a rule of the game, etc. are described. Furthermore, on the last eighth page, as shown in FIG. 11, as an explanation of the "(8) troubleshooting", a method of how to react to a trouble of a main body, communications, etc., is described, and in the first page, as shown in FIG. 12, as an explanation of "(1) notes on the use", a problem to be cautioned when the main body and the communications are used is described.

On the upper LCD 12 and the lower LCD 14, such an operating guide is displayed so as to be spread across the boundary between the upper and lower two screens (DS1 and DS2) on a page basis (displayed portion). Switching from the page that is being displayed to a next page or a previous page is executed in response to a direction designating operation (touch/button/pad input) utilizing the touch panel 16, the ABXY buttons 24a-24d, the cross key 24g, the analog pad 26, etc. For example, when a leftward direction designating operation (hereinafter abbreviated to as "left direction designating operation") is performed, for example, a sliding operation from right to left is performed on the lower LCD 14 provided with the touch panel 16 with the touch pen, or the like, the analog pad 26 is slid to the left direction, the A button 24a is pushed, or the left button of the cross key 24g is pushed in a state that the third page is displayed as shown in FIG. 8, the third page moves to the left, to switch the displays of the upper LCD 12 and the lower LCD 14 from the third page to the fourth page. On the other hand, when a right direction designating operation is performed in a state that the fourth page is displayed as shown in FIG. 9, the display is switched from the fourth page to the third page.

Furthermore, as to the operating guide, as can be understood from FIG. 8 to FIG. 10 and FIG. 20, information amount of the respective pages are different, and thus, the respective pages are different in a vertical size (here, the horizontal size is a fixed value the same as or little smaller than the width of the lower LCD 14). Accordingly, the fourth page having a relatively less information amount is entirely included in a display range of the upper LCD 12 and lower LCD 14 in the vertical direction and in the horizontal direction as shown in FIG. 9, but the third page having a relatively more information amount is entirely displayed within the display range in the horizontal direction, but out of the display range at a trailing end portion (the explanation as to the "3D switch" in the fourth line) in the vertical direction as shown in FIG. 8.

In this case, if an upward designating operation is performed, an upward scrolling is executed as shown in FIG. 10 to make the trailing end portion enter the display range. In stead thereof, the head portion (the part of layout drawing, here) is out of the display range. Here, the part of the title (heading) "(3) operation method" is fixed, and even if upward scrolling is executed, it is always displayed without being out of the display range. In order to return to the state in FIG. 8, a downward designating operation is only necessary performed.

Thus, in the game apparatus 10, the operating guide is displayed so as to be spread across the screen boundary on a page basis, and the displayed page can be switched to a previous or next page by a left and right direction designating operation, and each page displayed so as to spread across the screen boundary can be scrolled upward and downward with the respective parts in conjunction by a upward or downward direction designating operation.

In addition, in the game apparatus 10, by making use of the feature of the hardware that the display surface DS1 of the upper LCD 12 is wider than the display surface DS2 of the lower LCD 14, at the blank portions (margin portions) of the display surface DS1, that is, the left portion DS1b and the right portion DS1c, parts of the previous and next pages (part in the vertical and horizontal directions) are displayed. For example, as shown in FIG. 8, in a case that the third page is displayed, the upper right portion of the second page is displayed at the left portion DS1b, and the upper left portion of the fourth page is displayed at the right portion DS1c. Furthermore, as shown in FIG. 9, in a case that the fourth page is displayed, the upper right portion of the third page is displayed at the left portion DS1b, and the upper left portion of the fifth page is displayed at the right portion DS1c.

Here, even if the display content of the center portion DS1a is scrolled by the upward and downward designating operation, the display contents of the left portion DS1b and the right portion DS1c are not scrolled in conjunction therewith. For example, in FIG. 10 showing a state after an upward designating operation is performed from the sate in FIG. 8 (non-scrolled initial state), within the display surface DS1 of the upper LCD 12, the display content of the center portion DS1a is scrolled upward while the display contents of the left portion DS1b and the right portion DS1c are respectively still the upper right portion of the second page and the upper left portion of the fourth page, and remain unchanged from the sate in FIG. 8.

Furthermore, the page about which the center portion DS1a is in the scrolled state (state in which the page is scrolled halfway or to the last) is still displayed in the scrolled manner even if it is moved to the left portion DS1b or the right portion DS1c by page switching. Accordingly, it is possible to easily know whether or not the page moved to the left portion DS1b or the right portion DS1c is in the scrolled state. When the page thus moved to the left portion DS1b or the right portion DS1c in the scrolled state is returned to the center portion DS1a by a page switching in reverse performed thereafter, it is returned to the original scrolled state and displayed. Accordingly, as shown in FIG. 10, when the third page about which the center portion DS1a is in the scrolled state is moved to the left portion DS1b according to a left direction designating operation, it is displayed in the scrolled state as shown in FIG. 20, and then, when the third page about which the center portion DS1a is in the scrolled state is returned to the center portion DS1*a* in response to a reverse, that is, right direction designating operation, it is returned to the original scrolled state shown in FIG. 10 and displayed.

Figure 20:
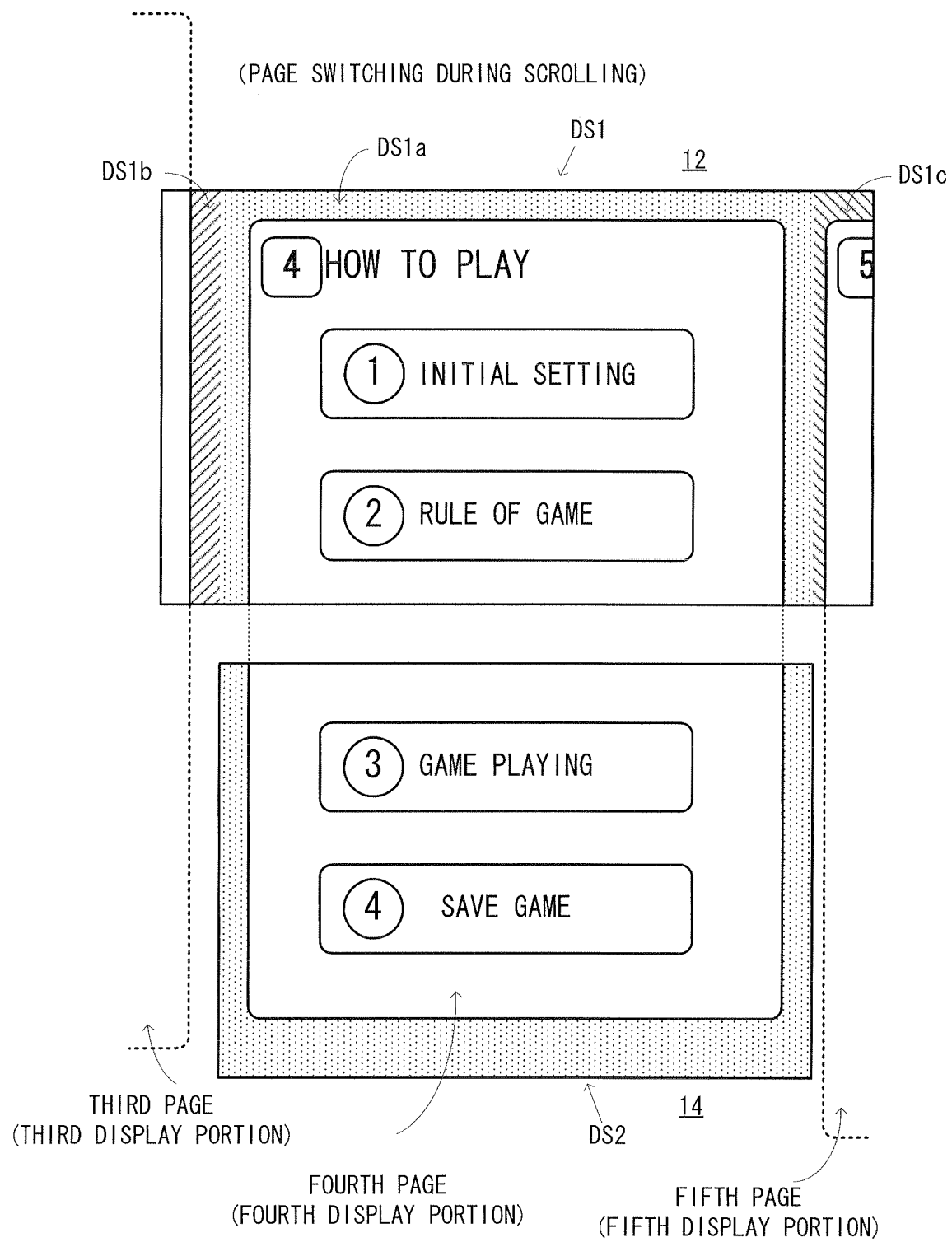
FIG. 20 is an illustrative view showing another display example (display switching in a scrolled state) of the operating guide.

In addition, in a case that the third page about which the center portion DS1*a* is in the scrolled state as shown in FIG. 10 is moved to the left portion DS1*b* in response to a left direction designating operation as shown in FIG. 20, and then moved out of the screen according to a further left direction designating operation, when it is returned to the center portion DS1*a* in response to successive two right direction designating operations, it is returned to the initial state as shown in FIG. 8 and displayed.

Furthermore, as shown in FIG. 11(A), when the last page, that is, the eighth page, here is displayed at the center portion DS1*a*, the upper right portion of the seventh page is displayed at the left portion DS1*b*, but no display is performed at the right portion DS1*c* (blacked out, for example). Thus, it is found that the eighth page is the last page, and there is no page (information) to be displayed thereafter. In addition, as shown in FIG. 12(A), when the beginning page, that is, the first page, here is displayed at the center portion DS1*a*, the upper left portion of the second page is displayed at the right portion DS1*c*, but no display is performed at the left portion DS1*b*. Thus, it is found that the first page is the beginning page, and there is no page to be displayed before it.

Here, depending on the operating guide, the pages are constructed like a ring shape, and the first page is displayed next to the last page, and the last page is displayed previous to the first page. In this case, when the last page, that is, the eighth page is displayed at the center portion DS1*a* as shown in FIG. 11(B), the upper left portion of the first page is displayed at the right portion DS1*c*. Thus, it is at least found that there is a page to be displayed after the eighth page. That is, it is found that the eighth page is the last page, and when an operation of switching to the next page is performed, returning to the first page is performed. Additionally, as shown in FIG. 12(B), when the beginning page, that is, the first page is displayed at the center portion DS1*a*, the upper right portion of the eighth page is displayed at the left portion DS1*b*. Thus, it is at least found that there is a page to be displayed before the first page. That is, it is found the beginning page is the first page, and when an operation of switching to the previous page, jumping to the last page is performed.

Here, if there is no page (information) to be displayed before and after, a message indicating this may be displayed at the right and left portions DS1*b*, DS1*c*.

Figure 13:
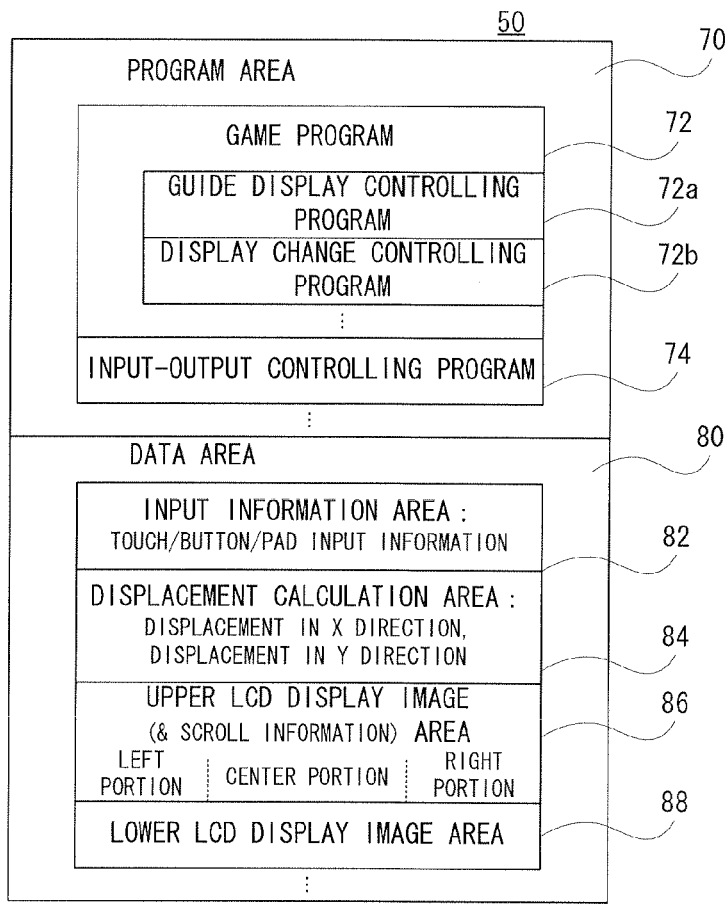
FIG. 13 is an illustrative view showing a memory map of the game apparatus.
Figure 13:
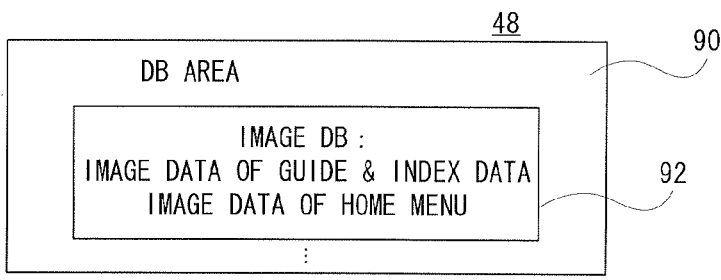
Figure 15:
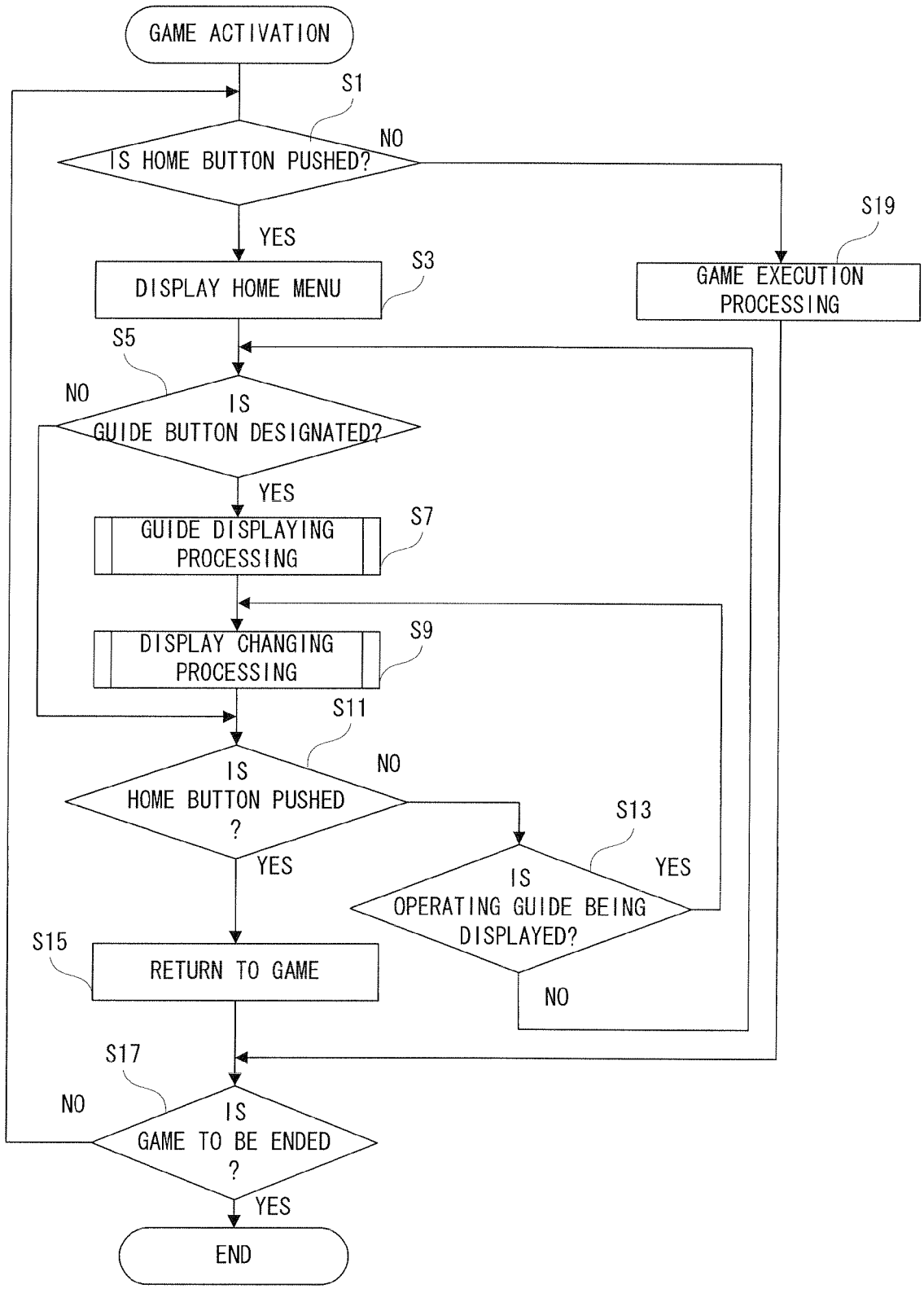
FIG. 15 is a flowchart showing a part of an operation by a CPU.
Figure 16:
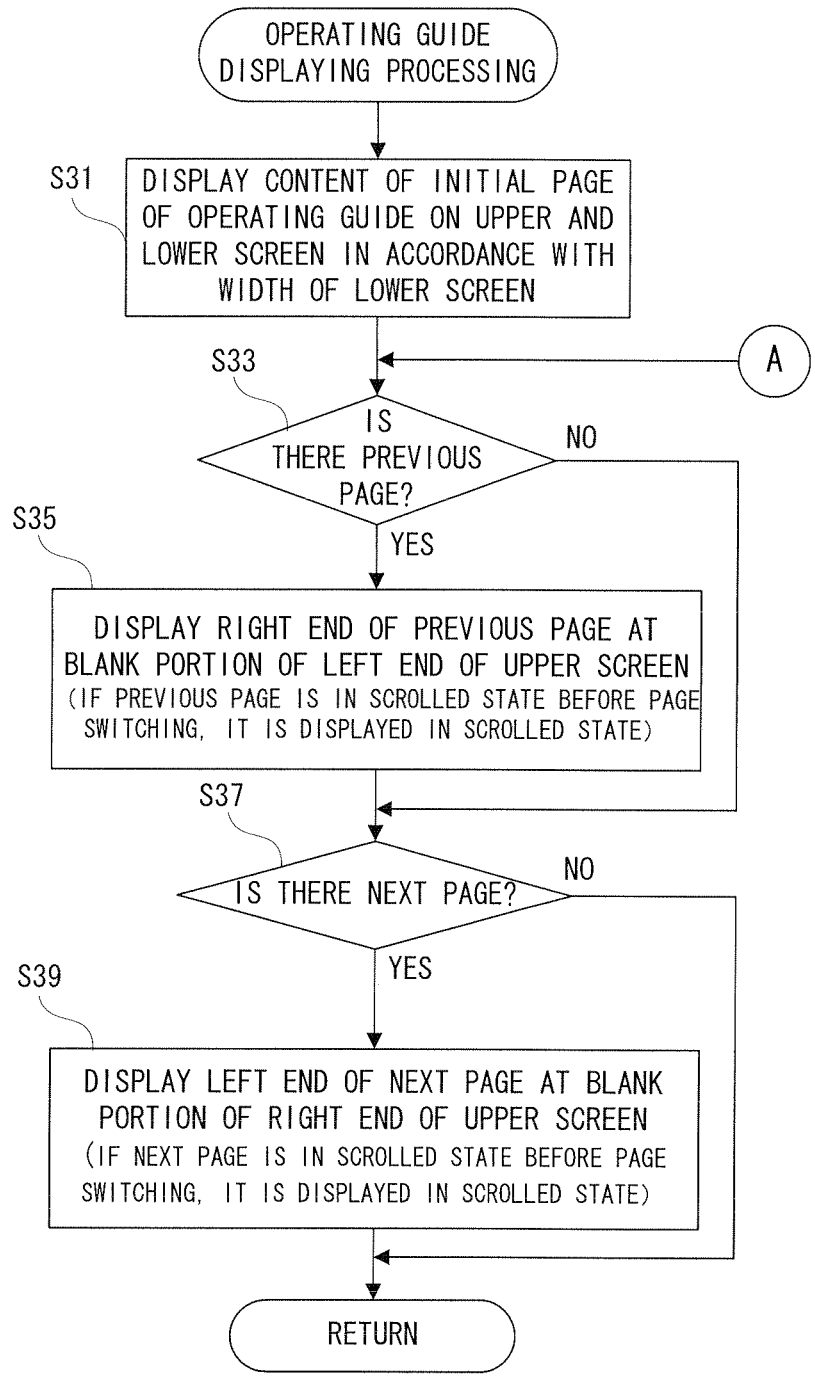
FIG. 16 is a flowchart showing another part of the operation by the CPU.
Figure 17:
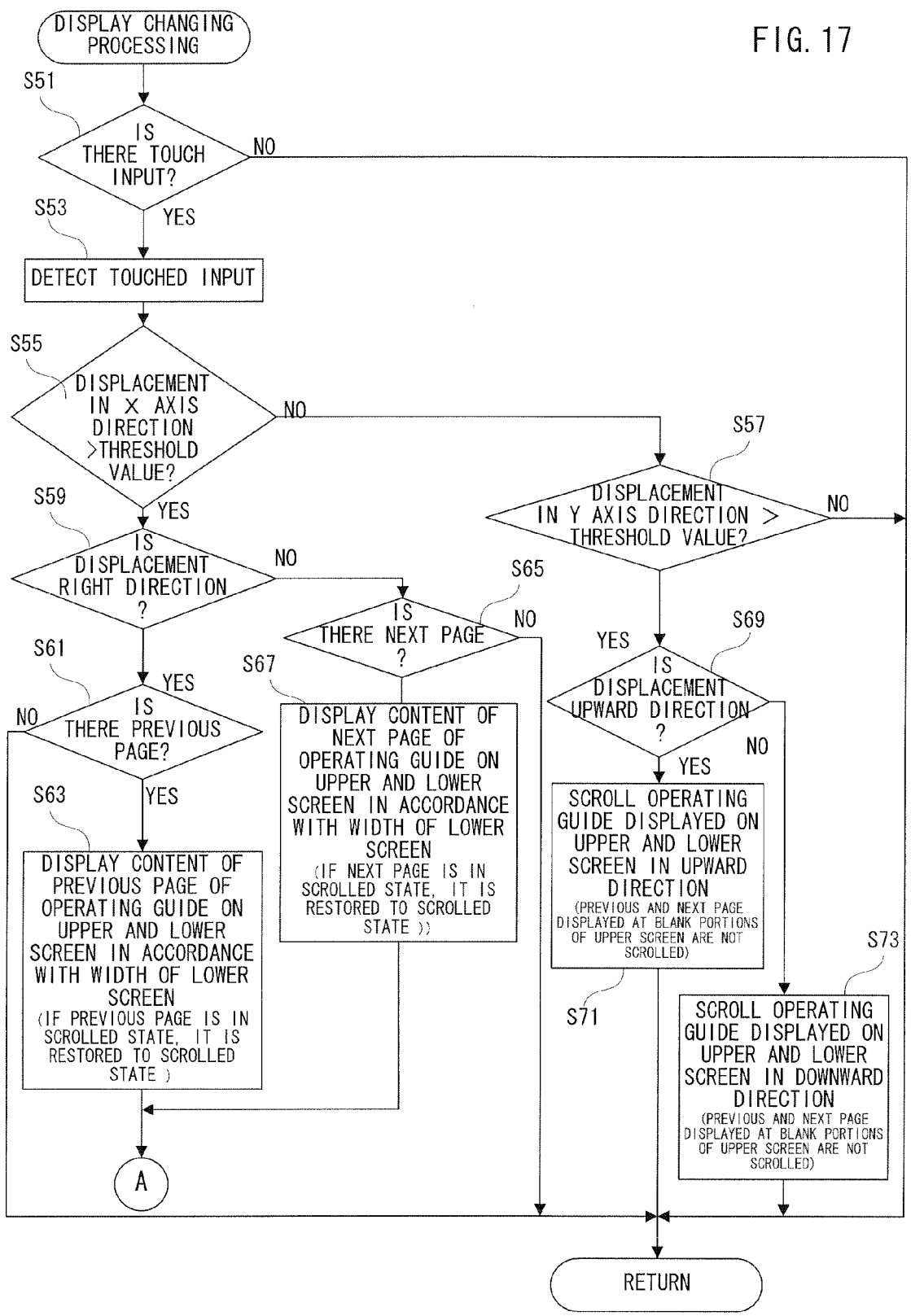
FIG. 17 is a flowchart showing a still another part of the operation by the CPU.

An operation as to an operating guide display of the game as described above is implemented by executing processing shown in FIG. 15 to FIG. 17 by the CPU 44*a* (SoC44) on the basis of programs and data as shown in FIG. 13(A) that are stored in the main memory 50, and a database (DB) as shown in FIG. 13(B) stored in the NAND flash memory 48.

Referring to FIG. 13(A), the main memory 50 is formed with a program area 70 and a data area 80, and in the program area 70, a game program 72, an input-output controlling program 74, etc. are stored. The game program 72 is a main program for implementing various functions in relation to the game via the SoC 44 and other pieces of hardware (see FIG. 4), and corresponds to the flowcharts in FIG. 15 to FIG. 17.

In the game program 72, a guide display controlling program 72*a*, a display change controlling program 72*b*, etc. are included as subprograms. The guide display controlling program 72*a* and the display change controlling program 72*b* are control programs for displaying the operating guide on the upper and lower LCDs 12 and 14 like manners shown in FIG. 8 to FIG. 12 and FIG. 20, and correspond to the flowcharts shown in FIG. 16 and FIG. 17.

A input-output controlling program 74 is a program for detecting a direction designating operation (touch/button/pad input) via the microcomputer 56 and the IF circuit 58, for example, and performing 2D/3D displays via the stereoscopic LCD controller 12A, and is utilized by the game program 72.

In the data area 80, an input information area 82, a displacement calculation area 84, an upper LCD display image area 86, a lower LCD display image area 88, etc. are formed. In the input information area 82, touch/button/pad input information detected by the input-output controlling program 74 is written. In the displacement calculation area 84, displacements in the X, Y directions calculated from the touched coordinates included in the touched input information of the input information area 82 are written. In the upper and lower LCD display image areas 86 and 88, display images on the upper and lower LCDs 12 and 14 are written on the basis of the processing result of the guide display controlling program 72*a* and the display change controlling program 72*b*. Specifically, the upper LCD display image area 86 is sectioned into the center portion and the right and left portions to which images corresponding to the center portion DS1*a* and the right and left portions DS1*b*, DS1*c* of the upper display surface DS1 are respectively written together with scroll information. The scroll information is information indicating, when an image is displayed at the center portion DS1*a*, whether the image is the scrolled state or the initial state.

Figure 14:
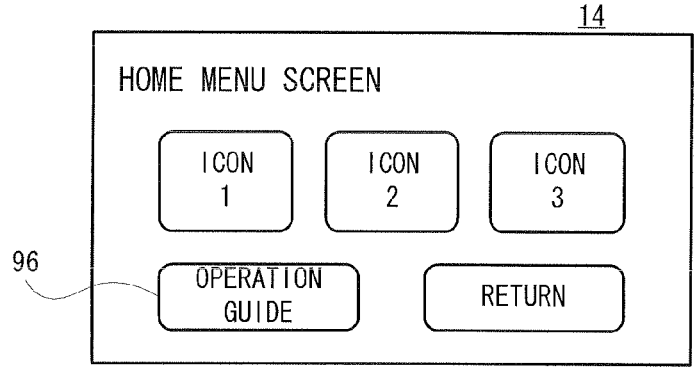
FIG. 14 is an illustrative view showing a display example of a Home menu screen.

In a DB area 90, an image DB 92 for registering image data of the guide and the index data shown in FIG. 8 to FIG. 12 and FIG. 20, and image data of a Home menu screen are stored in advance. The index data is data indicating a head position of each page in the image data of the guide, and is referred at a time of page switching. The Home menu screen is a screen to be displayed on the lower LCD 14 attached with the touch panel 16 for accepting a selection of various games/functions and a designation in relation to the display of the operating guide from the user, and includes a plurality of icons 1, 2, 3 . . . and the guide button 96 corresponding to each of the various games/functions as shown in FIG. 14. For example, when the icon 1 is designated by the touch pen, or the like, the game and the function corresponding to the icon 1 are activated. When the guide button 96 is designated, the aforementioned guide screen is displayed.

For example, in a case that an operating guide of a certain game is displayed, the user first pushes the home (Home) button 24*h* to call the Home menu screen, and designates the corresponding icon on the Home menu screen to activate the game. Thereafter, the user pushes the Home button 24*h* again to call the Home menu screen, and designates the guide button 96 on the Home menu screen, the operating guide of the game is displayed. The flowcharts in FIG. 15 to FIG. 17 show processing after the game is activated after the first Home menu display.

The CPU 44*a* executes processing according to the flowcharts in FIG. 15 to FIG. 17 when the game program 72 is activated. With first reference to FIG. 15, in a first step S1, it is determined whether or not the Home button 24*h* is pushed on the basis of the touch/button/pad input information of the input information area 82. If "NO", it is considered that any one of the icons is designated on the game menu screen (not illustrated), and the process shifts to a step S19 to execute the game processing corresponding to the icon. Thereafter, the process proceeds to a step S17 (described later).

If "YES" in the step S1, the process proceeds to a step S3 to display the Home menu screen (described above) as shown in FIG. 14 on the lower LCD 14 on the basis of the image data of the Home menu screen registered in the image DB 92. Then, in the step S5, it is determined whether or not the guide button 96 is designated on the basis of the touch/button/pad input information of the input information area 82, and if "NO" here, the process proceeds to a step S11 (described later). If "YES" in the step S5, the process proceeds to the step S11 through guide displaying processing in a step S7 and display changing processing in a step S9.

The guide displaying processing in the step S7 is executed according to a flowchart in FIG. 16 in detail. In a first step S31, the content of the initial page of the operating guide is displayed so as to be spread across the boundary between the upper and lower display surfaces DS1 and DS2 in accordance with the width of the display surface DS2 of the lower LCD 14 (hereinafter abbreviated to as "lower display surface DS2", etc.) (the display width of the page may be precisely coincident with the width of the lower display surface DS2, or slightly narrower than it as shown in FIG. 10, etc.). More specifically, the CPU 44a respectively writes a part and the other part of the image of the initial page to the center portion of the upper LCD display image area 86 and the lower LCD display image area 88, and instructs the upper and lower LCDs 12 and 14 to display each part image at the center portion DS1a of the upper display surface DS1 and on the lower display surface DS2.

Here, if the vertical size of the page is above the sum of the heights of the upper and lower display surfaces DS1 and DS2 (third page: see FIG. 8, for example), the lower end portion of the page is not displayed at first, and displayed by scrolling as described later (see FIG. 10). Furthermore, the initial page may always be the first page, or may be the first page at a time of the first activation, and may be the page at the last end at a time of the second activation time onward.

In a next step S33, it is determined whether or not there is a previous page on the basis of the index data of the image DB 92, and if "NO", the process proceeds to a step S37. If "YES" in the step S33, the right end of the previous page is displayed at the blank portion of the left end of the upper display surface DS1 (that is, left portion DS1b) in a step S35. More specifically, the CPU 44a writes the right end portion of the previous page image at the left portion of the upper LCD of the display image area 86 and instructs the upper LCD 12 to display the right end portion at the left portion DS1b of the upper display surface DS1. Thereafter, the process proceeds to the step S37.

Accordingly, when the operating guide is made up of eight pages in total from the first to eighth pages, and the initial page is the first page, there is no previous page, and thus, no display is performed at the left portion. DS1b (black out display, for example: see FIG. 12(A)). Here, in a case that the first to eighth pages are connected to be a ring shape, the page previous to the first page is the eighth page, and therefore, at the left portion DS1b, the right end portion (upper right end portion) of the eighth page is displayed (see FIG. 12(B)).

In the step S37, it is determined whether or not there is a next page, and if "NO", the process returns to the main flowchart (see FIG. 15). If "YES" in the step S37, the left end of the next page is displayed at the blank portion of the right end of the upper display surface DS1 (that is, the right portion DS1c) in a step S39. More specifically, the CPU 44a writes the left end portion of the image of the next page at the right portion of the upper LCD display image area 86, and instructs the upper LCD 12 to display the image of the portion at the right portion DS1c of the upper display surface DS1. Thereafter, the process returns to the flowchart in FIG. 15.

Accordingly, when the operating guide is made up of eight pages in total from the first to eighth pages, and the initial page is the eighth page, there is no next page, and therefore, no display is performed at the right portion DS1c (blackout display, for example: see FIG. 11(A)). Here, in a case that the first to eighth pages are connected in a ring shape, the page next to the eighth page is the first page, and therefore, the left end of the first page (upper left corner) is displayed at the right portion DS1c (see FIG. 11(B)).

The display changing processing shown in the step S9 is executed according to the flowchart shown in FIG. 17, for example. In a first step S51, it is determined whether or not there is a touch input on the basis of the touch/button/pad input information of the input information area 82, and if "NO", the process returns to the flowchart shown in FIG. 15. If "YES" in the step S51, a touched position is detected in a step S53 to calculate a displacement in each of the X-axis direction and the Y-axis direction, and the calculation result is written to the displacement calculation area 84. Thereafter, the process proceeds to a step S55 to determine whether or not a magnitude of the displacement in the X-axis direction is larger than a threshold value. If "NO" here, the process shifts to a step S57 to further determine whether or not a magnitude of the displacement in the Y-axis direction is larger than a threshold value, and if "NO" here as well, the process returns to the flowchart in FIG. 15.

If "YES" in the step S55, the process proceeds to a step S59 to determine whether or not the displacement in the X-axis direction is a right direction (sliding operation from left to right). If "YES" in the step S59, it is determined whether or not there is a previous page in a step S61, and if "NO", the process returns to the flowchart in FIG. 15. If "YES" in the step S61, the process proceeds to a step S63 to display the content of the previous page so as to be spread across the boundary between the upper and lower display surfaces DS1 and DS2 in accordance with the width of the lower display surface DS2. Here, the detailed processing in the step S63 is the same as that in the step S31 of the above-described guide displaying processing. Here, in the step S63, the scroll information indicating whether or not the page (that is, page before switching) that is displayed so as to be spread across the boundary of the upper and lower display surfaces DS1 and DS2 indicates a scrolled state is stored, and if the scroll information of the page to be switched (that is, page before switching) indicates the scrolled state, the page to be switched is returned to the original scrolled state and displayed, and if the scroll information indicates the initial state, the page to be switched is displayed in the initial state (that is, from heading). Then, jumping to the step S33 is made.

Accordingly, after jumping, if there are pages previous to and next to the page after the display switching in the step S63, displaying the previous and next pages at the blank portion of the upper display surface DS1, that is, the right and left portions DS1b, DS1c is further executed through steps S35, S39. At this time, in a case that the page before the display switching (through step S71 or S73 described later) in the step S63 is in the scrolled state, the page is displayed to be still in the scrolled state at the right and left portions DS1b, DS1c. That is, at the right and left portions DS1b, DS1c, in a case that the scroll information of the page indicates the scrolled state, the page is displayed in the scrolled state, and if it indicates the initial state, the page is displayed in the initial state.

If "NO" in the step S59, it is considered that the displacement is the left direction (sliding operation from right to left), the process shifts to a step S65 to determines whether or not there is a next page, and if "NO", the process returns to the flowchart in FIG. 15. If "YES" in the step S65, the process proceeds to a step S67, and the CPU 44a displays the content of the next page so as to be spread across the boundary between the upper and lower display surfaces DS1 and DS2, matching the content of the next page with the width of the lower display surface DS2. Here, the detailed processing in the step S67 is also the same as that in the step S31. Here, in the step S67, the scroll information indicating whether or not the page that has been displayed to be spread across the boundary between the upper and lower display surfaces DS1 and DS2 at that time (that is, the page to be switched) is in the scrolled state is stored. In a case that the scroll information of the switched page (that is, page after switching) indicates the scrolled state, the switched page is returned to the original scrolled state and displayed, and in a case that the scroll information indicates the initial state, the switched page is displayed in the initial state (that is, from the head). Thereafter, jumping to the step S33 is made.

Accordingly, after jumping, if there are pages previous to and next to the switched page in the step S67, displaying the previous and the next pages at the blank portion of the upper display surface, that is, the right and left portions DS1$b$, DS1$c$ is further executed through the steps S35, S37. At this time, in a case that the page before page switching (page to be switched) in the step S67 (through processing in the step S71 or S73 described later) is in the scrolled state, the page is displayed at the right and left portions DS1$b$, DS1$c$ still in the scrolled state.

If "YES" in the step S57, the process proceeds to a step S69 to determine whether or not the displacement in the Y-axis direction is the upward direction (sliding operation from bottom to top). If "YES" here, the content of the page displayed so as to be spread across the boundary between the upper and lower display surfaces DS1 and DS2 is scrolled upward in a step S71. At this time, the previous and next pages displayed at the right and left portions DS1$b$ and DS1$c$ of the upper display surface DS1 are not scrolled in either direction. That is, in response to a scrolling operation, updating the image data is performed on the center portion of the upper LCD display image area 86 and the lower LCD display image area 88 while updating the image data is not performed on the right and left portions of the upper LCD display image area 86. Thereafter, the process returns to the flowchart in FIG. 15.

If "NO" in the step S69, it is considered that the displacement is performed downward (sliding operation from top to bottom), and the process proceeds to a step S73. In the step S73, the content of the page displayed to be spread across the upper and lower display surfaces DS1 and DS2 is scrolled downward. At this time, the previous and next pages displayed at the right and left portions DS1$b$ and DS1$c$ of the upper display surface DS1 are not scrolled in either direction. Thereafter, the process returns to FIG. 15.

Although illustration is omitted, by an input to the analog pad 26, an input to the cross key 24$g$, or an input to ABXY buttons 24$a$-24$d$ as well, a direction designation from left to right and from top to bottom can be performed, and in each case, display changing processing similar to FIG. 17 is executed. More specifically, when there is an input to the analog pad 26, the input direction (sliding direction) is determined. In a case of the right direction, processing corresponding to the steps S61 and S63 is executed, in a case of the left direction, processing corresponding to the steps S65 and S67 is executed, in a case of the upward direction, processing corresponding to the step S71 is executed, and in a case of the downward direction, processing corresponding to the step S73 is executed.

Similarly, if there is an input to the cross key 24$g$, the pushed position (the left, right, up and down button) is determined. In a case of the right button, processing corresponding to the steps S61 and S63 is executed, and in a case of the left button, processing corresponding to the steps S65 and S67 is executed. In a case of the upper button, processing corresponding to the step S71 is executed, and in a case of the lower button, processing corresponding to the step S73 is executed. Alternatively, when there is an input to any one of the A B X Y buttons 24$a$-24$d$, the pushed button is determined. In a case of the Y button 24$d$, processing corresponding to the steps S61 and S63 is executed, in a case of the A button 24$a$, processing corresponding to the steps S65 and S67 is executed, in a case of the X button 24$c$, processing corresponding to the step S71 is executed, and in a case of the B button 24$b$, processing corresponding to the step S73 is executed.

With reference to FIG. 15 again, in the step S11, it is determined whether or not the Home button 24$h$ is pushed, and if "NO", the process returns to a step S13 to further determine whether or not the operating guide is being displayed. If "NO" here, the process returns to the step S5. If "YES" in the step S13, the process returns to the step S9. If "YES" in the step S11, returning to the game is performed in a step S15, and the process proceeds to a step S17.

In the step S17, it is determined whether or not the game is to be ended. If "NO", the process returns to the step S1 to repeat the processing described above. When the end operation is performed, or an end condition is satisfied as a result of the game executing processing, "YES" is determined in the step S17, and the processing is ended.

As understood from the above description, the game apparatus 10 of this embodiment has the upper and lower LCDs 12 and 14 being different in width and an inputter like the touch panel 16, etc. The computer of the game apparatus 10, that is, the SoC 44 or the CPU 44$a$ displays, out of information being made up of a plurality of pages, information of the predetermined page on the upper and lower LCDs 12 and 14 (the center portion DS1$a$ of the upper display surface DS1 and the lower display surface DS2) in accordance with the width of the lower LCD 14 (S31), if there are pages previous to or next to the predetermined page, a part of the previous or next page is displayed at a blank portion (the left portion DS1$b$ and the right portion DS1$c$) at the right and left of the upper LCD 12 (S35, S39). Then, in response to an input from the inputter, the information of the page displayed on the upper and lower LCDs 12 and 14 is switched to the information corresponding to the previous or next page displayed on the blank portion of the upper LCD 12 (S63, S67). Accordingly, it is possible to easily know that there is information to be displayed previous to or next to the page displayed on the upper and lower LCDs 12 and 14.

Figure 18:
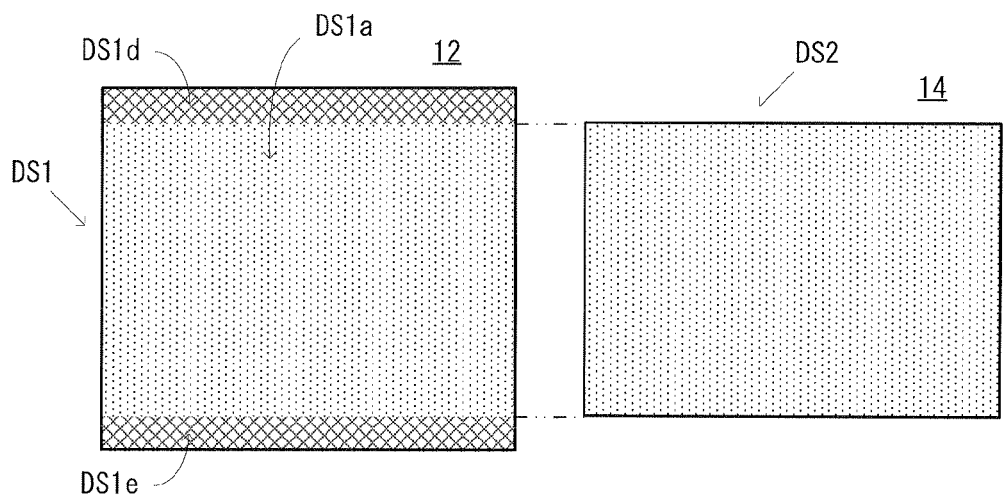
FIG. 18 is an illustrative view showing a relationship between the right and left LCDs in one modified example.

Here, in this embodiment, the upper display surface DS1 is larger in width than the lower display surface DS2, but may be larger in height. In this case, at the blank portions caused due to the differences in the height direction, parts of the previous and next pages may be displayed. Specifically, as shown in FIG. 18, if the two display surfaces DS1 and DS2 are arranged side by side, and the content of the page (information) is displayed so as to be spread across the boundary between the right and left display surfaces DS1 and DS2, even if the previous and next pages are displayed at the blank portions (upper and lower portions DS1$d$ and DS1$e$) caused due to the differences in the height direction, no uncomfortable feeling occurs.

Figure 19:
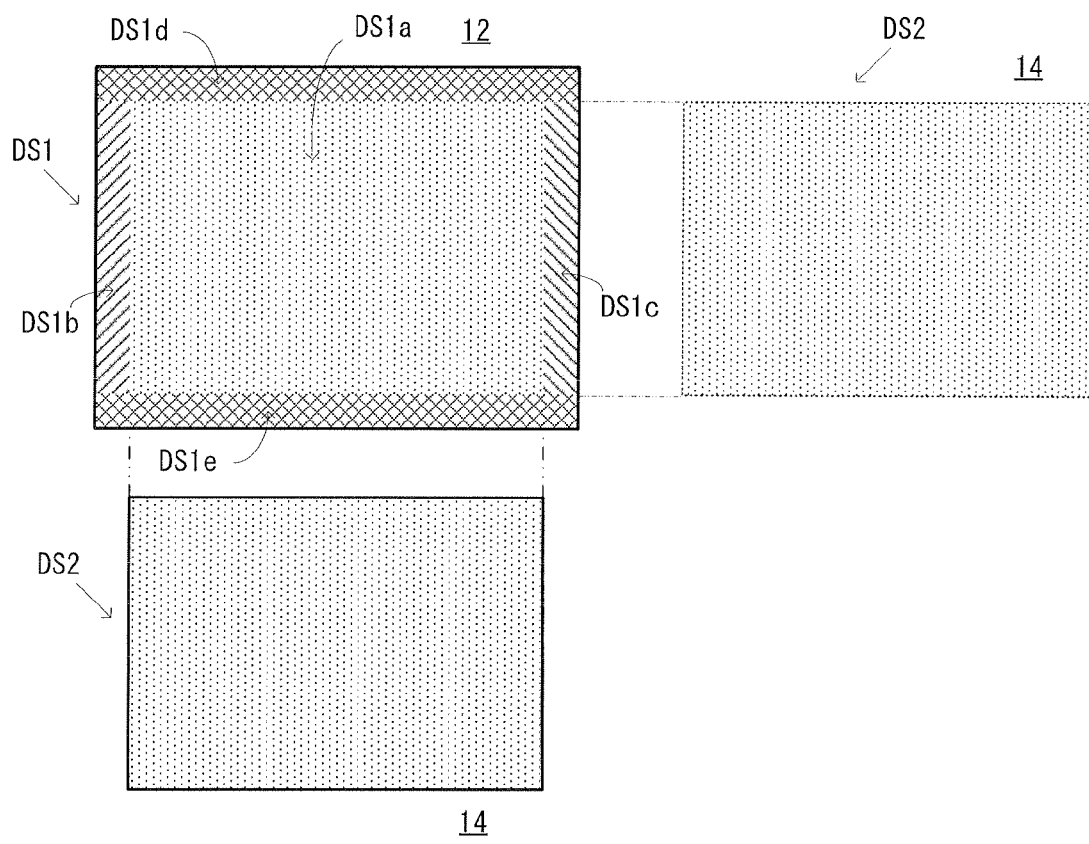
FIG. 19 is an illustrative view showing a relationship between the upper and lower (right and left) LCDs in another modified example.

Alternatively, as shown in FIG. 19, the upper (left) display surface DS1 may be made larger than the lower (right) display surface DS2 in the width and height. This makes it possible to display more information by the amount enlarged in the height direction (upper and lower portions DS1$d$ and DS1$e$) on the upper (left) display surface DS1, and display the part of the previous and next pages at the blank portion (right and left portions DS1$b$ and DS1$c$) caused by the differences between the display surface DS1 and the lower (right) display surface DS2 in the width direction. Then, the width and the height may be dealt reversely.

Furthermore, the touch panel 16 may be provided not on the lower LCD 14 but on the upper LCD 12. Alternatively, the touch panel 16 may be provided on both of the upper and lower LCDs 12 and 14.

In addition, the display of the operating guide may be performed in the three-dimensional manner, or may be performed by switching between the two-dimensional manner and the three-dimensional manner as necessary. For example, in a case that the operating guide is displayed in the three-dimensional manner on the upper LCD 12, referring to FIG. 5, the CPU 44a creates right and left image data with parallax from the image data of the guide registered in the image DB 92, and writes the same to the VRAM44c as a left image 44L and a right image 44R.

Furthermore, the part of the title (heading) of "(3) operation method" is fixed in this embodiment, and is always displayed (see FIG. 10), but this may be changed so as to be moved in accordance with scrolling. In this case, in FIG. 10, "(3) operation method" and a part of the layout drawing are out of the display range.

In addition, even if the page that is in the scrolled state at the center portion DS1a is moved to the left portion DS1b or the right portion DS1c by page switching, it is displayed in the scrolled state in this embodiment, but this page in the scrolled state may be returned to the non-scrolled initial state and displayed (the head portion is the uppermost portion). Thus, when the page that is moved to the left portion DS1b or the right portion DS1c and changed to the initial state returns to the center portion DS1a according to a reverse page switching performed thereafter, the page is returned to the original scrolled state and displayed. Accordingly, as shown in FIG. 10, when the third page that is in the scrolled state at the center portion DS1a is moved to the left portion DS1b in response to a left direction designating operation, it is displayed in the initial state as shown in FIG. 9. Thereafter, when the third page is returned to the center portion DS1a in response to a reverse direction, that is, right direction designating operation, it is returned to the original scrolled state and displayed as shown in FIG. 10.

In the above description, the game apparatus 10 is explained, but the present invention can be applied to various display controlling apparatuses having displayers and inputters (cellular phone, PDA, various home information appliances, etc. other than the game machine). The present invention can be applied to a display controlling system in which various processing for the display control can distributedly be processed by a plurality of computers, etc. In addition, the present invention can be applied to the game program and the application program for such a display controlling apparatus or a system. In a case that the present invention is applied to the application program, the game program 72 in FIG. 14 is modified to the application program, and the "game" in FIG. 15 is modified to "application".

Although the present invention has been described and illustrated in detail, it is clearly understood that the same is by way of illustration and example only and is not to be taken by way of limitation, the scope of the present invention being limited only by the terms of the appended claims.

Furthermore, it should be understood that overall the embodiment of the present invention, a representation of a singular form also includes a concept of the plural form unless otherwise stated. Accordingly, an article or an adjective in the singular (for example, "a", "an", "the", etc. for English) also includes a concept of the plural form unless otherwise stated.

What is claimed is:

1. A non-transitory computer readable storage medium storing an information processing program, said information processing program including computer executable instructions for causing an information processing apparatus having a computer processor, a display apparatus and an inputter to function as:
   a display controller which displays a predetermined portion out of information being made up of a plurality of separate sequentially prearranged displayable portions on a screen of said display apparatus;
   a scrolling processor which controls a scrolling of the predetermined portion in a predetermined direction on the screen in response to an input via the inputter which designates a scrolling operation;
   a previous/next portion displayer which, if there is an existing previous or next portion of said displayable portions which precedes or comes after said predetermined portion, displays either a blank space or a small part of said existing previous or next portion along with and in an area on the screen along a side of said predetermined portion being displayed which is orthogonal to the predetermined direction in which the predetermined portion is scrolled, wherein a displayed small part of said existing previous/next portion is smaller than said predetermined portion; and
   a display switcher which switches the predetermined portion being displayed to one or the other of the existing previous or next portion in response to an input from said inputter.

2. A non-transitory computer readable storage medium storing an information processing program according to claim 1, wherein
   said information processing program causes said computer processor to further function as:
      a portion determiner which determines if there is a previous or a next portion which is situated immediately prior to or immediately after said predetermined portion, wherein
      said previous/next portion displayer which, when said portion determiner determines that there is an existing previous or next portion, displays a part of said previous or next portion.

3. A non-transitory computer readable storage medium storing an information processing program according to claim 2, wherein
   said previous/next portion displayer displays no part of said plurality of displayable portions as said previous/next portion when said portion determiner determines that there is no existing previous or next portion.

4. A non-transitory computer readable storage medium storing an information processing program according to claim 1, wherein
   said information processing apparatus has a first display and a second display having a display region larger than that of said first display apparatus, and
   said information processing program further causes a displaying of said predetermined portion using an entire display region of said first display apparatus and a region on said second display apparatus corresponding to a size of the display region of said first display apparatus, and
   further causes said previous/next portion displayer to display a part of said previous or next portion in an area on said second display apparatus which is outside of an area corresponding to the size of the display region of said first display apparatus displayed on said second display apparatus.

5. A non-transitory computer readable storage medium storing an information processing program according to claim 1, wherein said information processing apparatus includes a first display apparatus and a second apparatus having a display region larger in width than said first apparatus, and said first display apparatus and said second display apparatus are arranged such that respective display regions of each display apparatus are aligned along a common vertical axis, and said information processing program further causes a displaying of said predetermined portion using an entire display region of said first display apparatus and a central region on said second display apparatus having a same width as that of the display region of said first display apparatus, and further causes said previous/next portion displayer to display a part of said previous portion at any one of right and left regions except for said central region of said second display apparatus, and to display a part of said next portion at the other of right and left regions of said second display apparatus.

6. A non-transitory computer readable storage medium storing an information processing program according to claim 5, wherein said first display apparatus and said second display apparatus are arranged such that center points of respective display regions of each display apparatus are on the same vertical line.

7. A non-transitory computer readable storage medium storing an information processing program according to claim 1, wherein said information processing apparatus includes a first display apparatus and a second display apparatus, said displayer displays a part of said predetermined portion on said first display apparatus, and displays a remaining part of said predetermined portion at a main region of said second display apparatus, and said previous/next portion displayer displays the part of said previous or next portion at a sub region of said second display apparatus.

8. A non-transitory computer readable storage medium storing an information processing program according to claim 7, wherein said information processing program causes said computer processor to further function as a scrolling processor which scrolls the part of said predetermined portion displayed on said first display apparatus and the remaining part of said predetermined portion displayed at said main region of said second display apparatus in conjunction with each other in response to an input for designating scrolling.

9. A non-transitory computer readable storage medium storing an information processing program according to claim 8, wherein in an object to be processed by said scrolling processor, the part of a predetermined display region displayed on said first display apparatus and a remaining part of said predetermined portion displayed on said main region of said second display apparatus are included, and the previous or next portion displayed at said sub region of said second display apparatus is not included.

10. A non-transitory computer readable storage medium storing an information processing program according to claim 1, wherein said inputter includes a first inputter for designating display switching and a second inputter for designating scrolling, said displayer displays a part of a region out of said predetermined portion having a region larger than a display screen of said display apparatus in a first direction on said display apparatus, and said previous/next portion displayer displays the part of said previous or next displayed portion in a second direction different from said first direction as seen from said predetermined portion displayed by said displayer, said display switcher switches said predetermined portion displayed on said display apparatus to the previous or next portion displayed by said previous/next portion displayer in response to a first input from said first inputter, and said information processing program causes said computer processor to further function as:

a scrolling processor which scrolls such that the other region of said predetermined portion is displayed on said display apparatus in response to an input from said second inputter.

11. A non-transitory computer readable storage medium storing an information processing program according to claim 10, wherein in an object to be processed by said scrolling processor, the entire display region of said first display apparatus and the predetermined portion displayed at said central region out of the display region of said second display apparatus are included, and the previous or next portion information displayed at said right and left regions of said second display apparatus is not included.

12. A non-transitory computer readable storage medium storing an information processing program according to claim 11, wherein said previous/next portion displayer, in a case that the predetermined portion displayed on said display apparatus by said displayer is in a scrolled state by said scrolling processor before a switch by said display switcher, displays said predetermined portion in a scrolled manner.

13. A non-transitory computer readable storage medium storing an information processing program according to claim 10, wherein said displayer, in a case that the previous or next portion displayed by said the previous/next portion displayer before a current switch by said display switcher is in a scrolled manner by said scrolling processor when it is displayed on the display apparatus by said displayer before a previous switch, returns the information corresponding to the previous or next portion to the scrolled state and displays the same.

14. A non-transitory computer readable storage medium storing an information processing program according to claim 1, wherein said information is an electronic file being made up of a plurality of pages.

15. An information processing apparatus including one or more computer processor, comprising:

a display apparatus;

an inputter;

wherein said one or more computer processor is configured to function as:

a display controller which displays a predetermined portion out of information being made up of a plurality of separate sequentially prearranged displayable portions on a screen of said display apparatus;

a scrolling processor which controls a scrolling of the predetermined portion in a predetermined direction on the screen in response to an input via the inputter which designates a scrolling operation;

a previous/next portion displayer which, if there is an existing previous or a next portion of said displayable portions which precedes or comes after said predetermined portion, displays either a blank space or a small part of said existing previous or next portion along with and in an area on the screen along a side of said predetermined portion being displayed which is orthogonal to the predetermined direction in which the predetermined portion is scrolled, wherein a displayed small part of said existing previous/next portion is smaller than said predetermined portion; and as a display switcher which switches the predetermined portion being displayed by said display apparatus to a previous or next predetermined portion in response to an input from said inputter.

16. An information processing system, comprising;

a display apparatus;

an inputter; and one or more computer processor configured to function and perform operations as:

a display controller which displays a predetermined portion out of predetermined information being made up of a plurality of separate sequentially prearranged displayable portions on a screen of said display apparatus;

a scrolling processor that controls a scrolling of the predetermined portion in a predetermined direction on the screen in response to an input via the inputter which designates a scrolling operation;

a previous/next portion displayer which, if there is an existing previous or next portion of said displayable portions which precedes or comes after said predetermined portion, displays either a blank space or a small part of said existing previous or next portion along with and in an area on the screen along a side of said predetermined portion being displayed which is orthogonal to the predetermined direction in which the predetermined portion is scrolled, wherein a displayed small part of said existing previous/next portion is smaller than said predetermined portion; and a display switcher which switches the predetermined portion being displayed by the display apparatus to one or the other of the existing previous or next portion in response to an input from said inputter.

17. A computer implemented display information processing method using an apparatus having one or more computer processor and a display apparatus and an input apparatus, the method comprising:

displaying, using said one or more computer processor, a predetermined portion of information out of information being made up of a plurality of separate sequentially prearranged displayable portions on a screen of the display apparatus;

scrolling the predetermined portion in a predetermined direction on the screen in response to an input via the inputter which designates a scrolling operation;

displaying, when there is an existing previous or next portion of said displayable portions which proceeds or comes after said predetermined portion, either a blank space or a small part of said existing previous or next portion along with and in an area on the screen along a side of said predetermined portion being displayed which is orthogonal to the predetermined direction in which the predetermined portion is scrolled, wherein a displayed small part of said existing previous/next portion is smaller than said predetermined portion; and switching the predetermined portion being displayed to one or the other of the existing previous or the next portion in response to an input from the input apparatus.

\* \* \* \* \*